United States Patent
Mazumder et al.

(10) Patent No.: US 12,473,653 B2
(45) Date of Patent: Nov. 18, 2025

(54) METHOD FOR INHIBITING CORROSION OF METAL ARTICLE

(71) Applicant: KING FAHD UNIVERSITY OF PETROLEUM AND MINERALS, Dhahran (SA)

(72) Inventors: Mohammad Abu Jafar Mazumder, Dhahran (SA); Shaikh Asrof Ali, Dhahran (SA); Ibrahim Yahia Yaagoob Mohamed, Dhahran (SA); Lipiar Khan Mohammad Osman Goni, Dhahran (SA); Chandrabhan Verma, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 406 days.

(21) Appl. No.: 18/327,549

(22) Filed: Jun. 1, 2023

(65) Prior Publication Data
US 2024/0401206 A1   Dec. 5, 2024

(51) Int. Cl.
*C23F 11/14*   (2006.01)

(52) U.S. Cl.
CPC .................. *C23F 11/141* (2013.01)

(58) Field of Classification Search
CPC .............. C23F 11/141; C23F 11/04
See application file for complete search history.

(56) References Cited

U.S. PATENT DOCUMENTS 10,285,400 B2   5/2019   Lei et al.
10,426,162 B2   10/2019   Man et al.
(Continued)

FOREIGN PATENT DOCUMENTS

WO   WO-2010043863 A2 *   4/2010   ............. A01N 47/44

OTHER PUBLICATIONS

N 4-Chloromethylbenzyl NN dimethyldodecan aminum Chloride a Quaternary Ammonium Surfactant as Corrosion Inhibitor Yaagoob Gopni Verma Mazumder Ali Chemistry Select 2023 (Year: 2023).*
(Continued)

*Primary Examiner* — Pamela H Weiss
(74) *Attorney, Agent, or Firm* — Oblon, McClelland, Maier & Neustadt, L.L.P.

(57) ABSTRACT

A method for inhibiting corrosion of a metal article in contact with a solution including an acid includes adding to the solution a corrosion inhibitor in an amount of 1 to 500 parts per million (ppm) based on the total number of parts by mass of the solution, thereby adsorbing the corrosion inhibitor onto the surface of the metal article via at least one interaction to form a barrier layer in the form of a composite. The at least one interaction comprises a physisorption, a chemisorption, and a retro donation. The corrosion inhibitor has a formula (I)

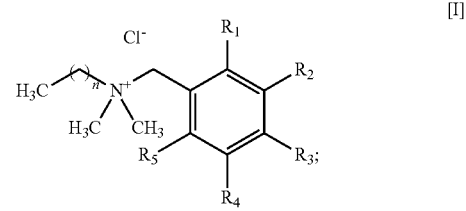

where n is any integer from 8 to 21 inclusive and $R_1$, $R_2$, $R_3$, $R_4$, and $R_5$ are each independently selected from the group consisting of a hydrogen atom, a hydroxyl group, an optionally substituted alkyl, an optionally substituted cycloalkyl, and an optionally substituted alkoxy.

14 Claims, 16 Drawing Sheets

(56) References Cited

U.S. PATENT DOCUMENTS

| | | | | |
|---|---|---|---|---|
| 2010/0197748 A1* | 8/2010 | Schwarz | ............... | C11D 3/373 514/642 |
| 2012/0128530 A1 | 5/2012 | Jenkins et al. | | |
| 2014/0262280 A1* | 9/2014 | Hill | ..................... | C09K 8/524 507/240 |
| 2015/0038470 A1* | 2/2015 | Keasler | ................. | A01N 57/34 514/129 |
| 2018/0305825 A1* | 10/2018 | Alkhaldi | ................ | C23F 11/04 |
| 2020/0255734 A1* | 8/2020 | Umoren | ................ | C23C 22/05 |

OTHER PUBLICATIONS

Experimental and theoretical studies of benzalkonium chloride as an inhibitor for carbon steel corrosion in sulfuric acid by Lei Guo Shanhong Zhu Shengtao Zhang Journal of Industrial and Engineering Chemistry 24 (2015) 174-180 (Year: 2015).*

Guanghua Zhang, et al., "Corrosion Inhibition of Q235 Steel by Octyl Dimethyl Benzyl Quaternary Ammonium Salt Ionic Liquid", Chemical Journal of Chinese Universities, vol. 40, Issue 1, Jan. 2019, pp. 130-137 (Abstract only).

Hany M. Abd El-Lateef, et al., "Novel Quaternary Ammonium-Based Cationic Surfactants: Synthesis, Surface Activity and Evaluation as Corrosion Inhibitors for C1018 Carbon Steel in Acidic Chloride Solution", Journal of Surfactants and Detergents, vol. 20, Issue 3, 2017, pp. 735-753.

* cited by examiner

METHOD FOR INHIBITING CORROSION OF METAL ARTICLE

STATEMENT OF ACKNOWLEDGEMENT

This research was supported by King Fahd University of Petroleum & Minerals (KFUPM) under the project INAM 2112.

BACKGROUND

Technical Field

The present disclosure is directed to a corrosion inhibitor, and particularly to a method for inhibiting corrosion of a metal article with a corrosion inhibitor.

Description of Related Art

The 'background' description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Carbon steel alloys are among the most frequently utilized structural metals in various industries. They are commonly used to construct storage tanks, distillation equipment, transport pipelines, and other structures in the petrochemical industry. However, carbon steel alloys are vulnerable to degeneration due to corrosion when they interact with environmental elements. Numerous electrolyte-based cleaning techniques, such as acid cleaning, pickling, descaling, and oil-well acidification, often cause corrosion. Such methods unavoidably involve ingesting extremely caustic and aggressive electrolytes to clean and remove surface contaminants. However, the aggressiveness of such solutions also causes the metallic parts and surface contaminants to deteriorate. A 15% HCl acidic solution has long been used for pickling purposes. Pickling in 15%, HCl often occurs briefly with one or more external additives known as corrosion inhibitors. The most widely used corrosion inhibitors are organic substances with heteroatoms and the appropriate balance of hydrophobic and hydrophilic groups. Organic inhibitors adhere to the metallic surface and create a hydrophobic protective barrier. A larger molecule is anticipated to occupy a greater surface area and be a better corrosion inhibitor than a relatively smaller molecule. However, there are issues with solubility in aqueous electrolytes for larger molecules, particularly those with aromatic rings.

Surfactants are a viable option for aqueous-phase corrosion inhibitors as they contain both hydrophilic and hydrophobic moieties. The hydrophilic portion typically interacts with the metal surface, while the hydrophobic part is directed towards the solution side. The arrangement of surfactant molecules at the interface depends on the type of environment. For instance, at the water-air interface, hydrocarbon chains point towards the water, while at the water-oil interface, they point towards the oil. The length of the carbon chain is believed to impact the surfactant molecules' inhibitory potential. Theoretically, longer hydrocarbon chains should correspond with better inhibitory performance. Most surfactant molecules exhibit optimal inhibition performance in the C8-C12 alkyl chain length. One of the commonly used surfactant groups is the quaternary ammonium surfactant (QAS). Unlike $NH_4^+$ (ammonium salt), QASs maintain their charge even when the pH of the solution changes. In these surfactants, the hydrocarbon chain acts as a hydrophobic fragment and the charged nitrogen as a hydrophilic component. The hydrophobic carbon chains align themselves with the solution side during their contact with the metal surface, while the cationic nitrogen aligns with the metal surface. This is undoubtedly accurate for surfactant molecules with the ideal size. However, a longer hydrocarbon chain has the reverse effect on how well they perform after a certain length due to their decreased solubility. Hence, there is a need to develop a method that may overcome or reduce the limitations above.

In view of the forgoing, one objective of the present disclosure is to describe a method for inhibiting corrosion of a metal article in contact with a solution containing an acid. A second objective of the present disclosure is to describe a method of making a corrosion inhibitor.

SUMMARY

In an exemplary embodiment, a method for inhibiting corrosion of a metal article in contact with a solution including an acid is described. The method includes adding to the solution a corrosion inhibitor in an amount of 1 to 500 parts per million (ppm) based on a total number of parts by mass of the solution thereby adsorbing the corrosion inhibitor onto a surface of the metal article via at least one interaction to form a barrier layer in the form of a composite. In some embodiments, The at least one interaction comprises a physisorption, a chemisorption, and a retro donation. In some embodiments, the corrosion inhibitor has a formula (I)

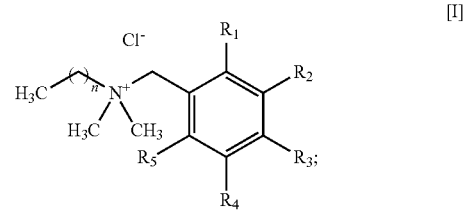

where n is any integer from 8 to 21 inclusive and $R_1$, $R_2$, $R_3$, $R_4$, and $R_5$ are each independently selected from the group consisting of a hydrogen atom, a hydroxyl group, an optionally substituted alkyl, an optionally substituted cycloalkyl, and an optionally substituted alkoxy.

In some embodiments, the corrosion inhibitor has a formula (II)

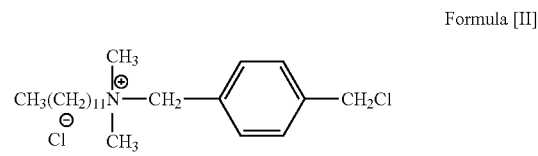

Formula [II]

In some embodiments, the acid includes at least one of hydrochloric acid, sulfuric acid, nitric acid, phosphoric acid, boric acid, and citric acid.

In some embodiments, the acid is present in the solution at a concentration of from 0.05 to 30 wt. % based on a total weight of the solution.

In some embodiments, the metal article includes at least one metal selected from the group consisting of a carbon steel, a carbon steel alloy, and a mild steel.

In some embodiments, the metal article is made of carbon steel. The carbon steel includes 0.1-2.0 wt. % Mn, 0.5-4.0 wt. % O, 1.0-8.0 wt. % C, and Fe as a balance, as determined by Energy-dispersive X-ray (EDX) spectroscopy.

In some embodiments, the metal article is part of a casing, a pipe, a pump, a screen, a valve, or a fitting of an oil or gas well.

In some embodiments, the corrosion inhibitor is present in the solution in an amount of 10 to 50 ppm based on a total number of parts by mass of the solution.

In some embodiments, the corrosion inhibitor is adsorbed onto the surface of the metal article via a chemical interaction, an electrochemical interaction, or a combination thereof.

In some embodiments, the barrier layer has an average thickness in a range of 10 to 1000 nanometers (nm).

In some embodiments, the surface of the metal article containing the barrier layer has a smoother surface morphology compared to a surface of the metal article in contact with an acid solution without the presence of the corrosion inhibitor.

In some embodiments, the corrosion inhibitor is adsorbed onto the surface of the metal article at a temperature of from 303 to 333 kelvin (K).

In some embodiments, the metal article is in contact with the acid solution for at least 2 hours.

In some embodiments, the method has an inhibition efficiency of 96 to 98% when the metal article is in contact with the solution at from 303 to 333 K, and the corrosion inhibitor is present in the solution in an amount of about 50 ppm based on a total number of parts by mass of the solution.

In some embodiments, the metal article has a corrosion rate of less than 8 millimeters per year (mm $y^{-1}$) in the solution including the acid and the corrosion inhibitor.

In some embodiments, the metal article has an $E_{corr}$ value of from −420 to −390 millivolts (mV) against the reversible hydrogen electrode ($V_{RHE}$).

In some embodiments, the method further includes preparing the corrosion inhibitor of formula (I) by mixing an alkylamine and a substituted benzyl halide in a solvent to form a mixture; heating the mixture to precipitate the corrosion inhibitor from a first mixture; and removing the precipitate from the mixture, washing, and drying. In some embodiments, a mole ratio of the alkylamine to the substituted benzyl halide is in a range of 1:1 to 1:10.

In some embodiments, the alkylamine includes an aliphatic carbon chain having from 9 to 22 carbons.

In some embodiments, the substituted benzyl halide includes at least one of 1,3-bis(chloromethyl)benzene, 1,4-bis(chloromethyl)benzene, and 1,2-bis(chloromethyl)benzene.

In some embodiments, the solvent is at least one of acetonitrile, N-methyl-pyrrolidone, propylene carbonate, and dimethylsulfoxide.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
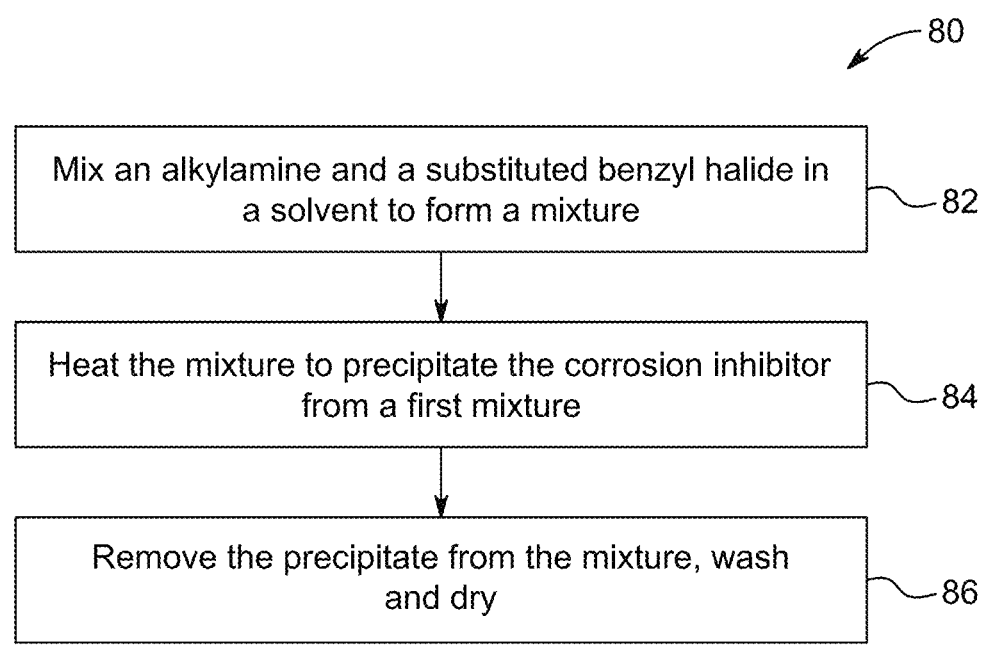
FIG. 1 is a flow chart of a method of preparing a corrosion inhibitor of formula (I), according to certain embodiments.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values there between.

As used herein, the term 'hydroxyl group' refers to the functional group with the chemical formula —OH— composed of one oxygen atom covalently bonded to one hydrogen atom.

As used herein, the term 'substituted' refers to at least one hydrogen atom replaced with a non-hydrogen group, provided that normal valencies are maintained and the substitution results in a stable compound. When a group is noted as 'optionally substituted,' the group may or may not contain non-hydrogen substituents. When present, the substituent(s) may be selected from alkyl, halo (e.g., chloro, bromo, iodo, fluoro), hydroxyl, alkoxy, oxo, alkanoyl, aryloxy, alkanoyloxy, amino (—$NH_2$), alkylamino (—NHalkyl), cycloalkylamino (—NHcycloalkyl), arylamino (—NHaryl), arylalkylamino (—NHarylalkyl), disubstituted amino (e.g., in which the two amino substituents are selected from alkyl, aryl or arylalkyl, including substituted variants thereof, with specific mention being made to dimethylamino), alkanoylamino, aroylamino, arylalkanoylamino, thiol, alkylthio, arylthio, arylalkylthio, alkylthiono, arylthiono, arylalkylthiono, alkylsulfonyl, arylsulfonyl, arylalkylsulfonyl, sulfonamide (e.g., —$SO_2NH_2$), substituted sulfonamide (e.g., —$SO_2$NHalkyl, —$SO_2$NHaryl, —$SO_2$NHarylalkyl, or cases where there are two substituents on one nitrogen selected from alkyl, aryl, or alkylalkyl), nitro, cyano, carboxy, unsubstituted amide (i.e., —$CONH_2$), substituted amide (e.g., —CONHalkyl, —CONHaryl, —CONHarylalkyl or cases where there are two substituents on one nitrogen selected from alkyl, aryl, or alkylalkyl), alkoxycarbonyl, aryl, guanidine, heterocyclyl (e.g., pyridyl, furyl, morpholinyl, pyrrolidinyl, piperazinyl, indolyl, imidazolyl, thienyl, thiazolyl, pyrrolidyl, pyrimidyl, piperidinyl, homopiperazinyl), and mixtures thereof. The substituents may be optionally substituted and maybe unprotected or protected as necessary, as known to those skilled in the art.

As used herein, the term 'optionally substituted cycloalkyl' refers to the cycloalkyl group which is substituted with one, two, or three substituents independently selected from hydroxyl, alkoxy, carboxy, cyano, alkoxycarbonyl, alkylthio, alkylsulfonyl, halo, haloalkoxy, —CONRR' or —NRR' (where each R is hydrogen, alkyl, hydroxyalkyl, or alkoxyalkyl, and each R' is hydrogen, alkyl, or cycloalkyl) or heterocyclic (preferably heterocycloamino) optionally substituted with one or two groups independently selected from alkyl, hydroxyl, alkoxy, alkylsulfonyl, halo, or —CONRR' where R and R' are as defined above.

The term 'optionally substituted alkoxy' refers to the alkoxy group which is substituted with one, two, or three substituents independently selected from hydroxyl, alkoxy, carboxy, cyano, alkoxycarbonyl, alkylthio, alkylsulfonyl, halo, haloalkoxy, —CONRR' or —NRR' (where each R is hydrogen, alkyl, hydroxyalkyl, or alkoxyalkyl, and each R' is hydrogen, alkyl, or cycloalkyl) or heterocyclic (preferably heterocycloamino) optionally substituted with one or two groups independently selected from alkyl, hydroxyl, alkoxy, alkylsulfonyl, halo, or —CONRR' where R and R' are as defined above.

The term 'optionally substituted alkyl' refers to the alkyl group which is substituted with one, two, or three substituents independently selected from hydroxyl, alkoxy, carboxy, cyano, alkoxycarbonyl, alkylthio, alkylsulfonyl, halo, haloalkoxy, —CONRR' or —NRR' (where each R is hydrogen, alkyl, hydroxyalkyl, or alkoxyalkyl, and each R' is hydrogen, alkyl, or cycloalkyl) or heterocyclic (preferably heterocycloamino) optionally substituted with one or two groups independently selected from hydroxyl, alkoxy, alkylsulfonyl, halo, or —CONRR' where R and R' are as defined above.

As used herein, the term 'working electrode' refers to the electrode in an electrochemical cell/device/sensor on which the electrochemical reaction of interest is occurring.

As used herein, the term 'counter electrode' refers to the electrode used in an electrochemical cell for voltammetric analysis or other reactions in which an electric current is expected to flow.

As used herein, the term 'corrosion inhibitor or anticorrosive' refers to the chemical compound that, when added to a liquid or gas, decreases the corrosion rate of a material, typically a metal or an alloy, that meets the fluid. The effectiveness of a corrosion inhibitor depends on fluid composition, quantity of water, and flow regime.

According to an aspect of the present disclosure, a method for inhibiting corrosion of a metal article in contact with a solution including an acid. The method includes adding to the solution a corrosion inhibitor in an amount of 1 to 500 ppm based on a total number of parts by mass of the solution thereby adsorbing the corrosion inhibitor onto a surface of the metal article via at least one interaction to form a barrier layer in the form of a composite. In some embodiments, the metal article may be made up of solder, brass, pewter, duralumin, bronze, and amalgams; and may be a part of a casing, a pipe, a pump, a screen, a valve, or a fitting of an oil or gas well. In some embodiments, the metal article may be a part of railings, tubing, plumbing fixtures, gutters, downspouts, and radiators. In some embodiments, the metal article is in contact with the solution for at least 2 hours, preferably at least 4 hours, preferably at least 8 hours, preferably at least 24 hours, or even more preferably at least 48 hours. Other ranges are also possible. The metal article includes at least one metal selected from the group consisting of carbon steel, a carbon steel alloy, and mild steel. In a preferred embodiment, the metal article is made of carbon steel.

Figure 9A:
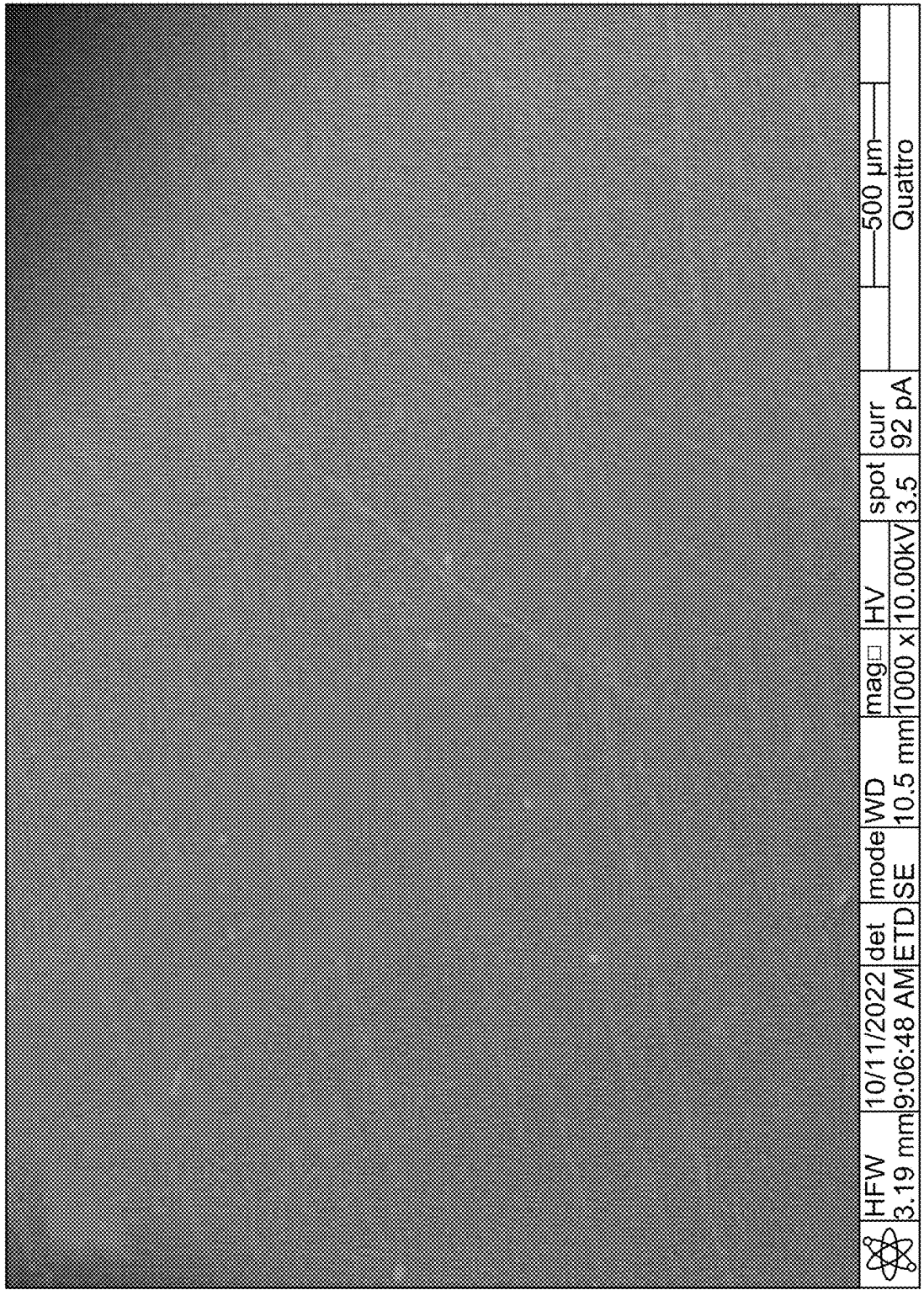
FIG. 9A depicts a scanning electron microscopy (SEM) image of a polished C1018 CS surface, according to certain embodiments.
Figure 9B:
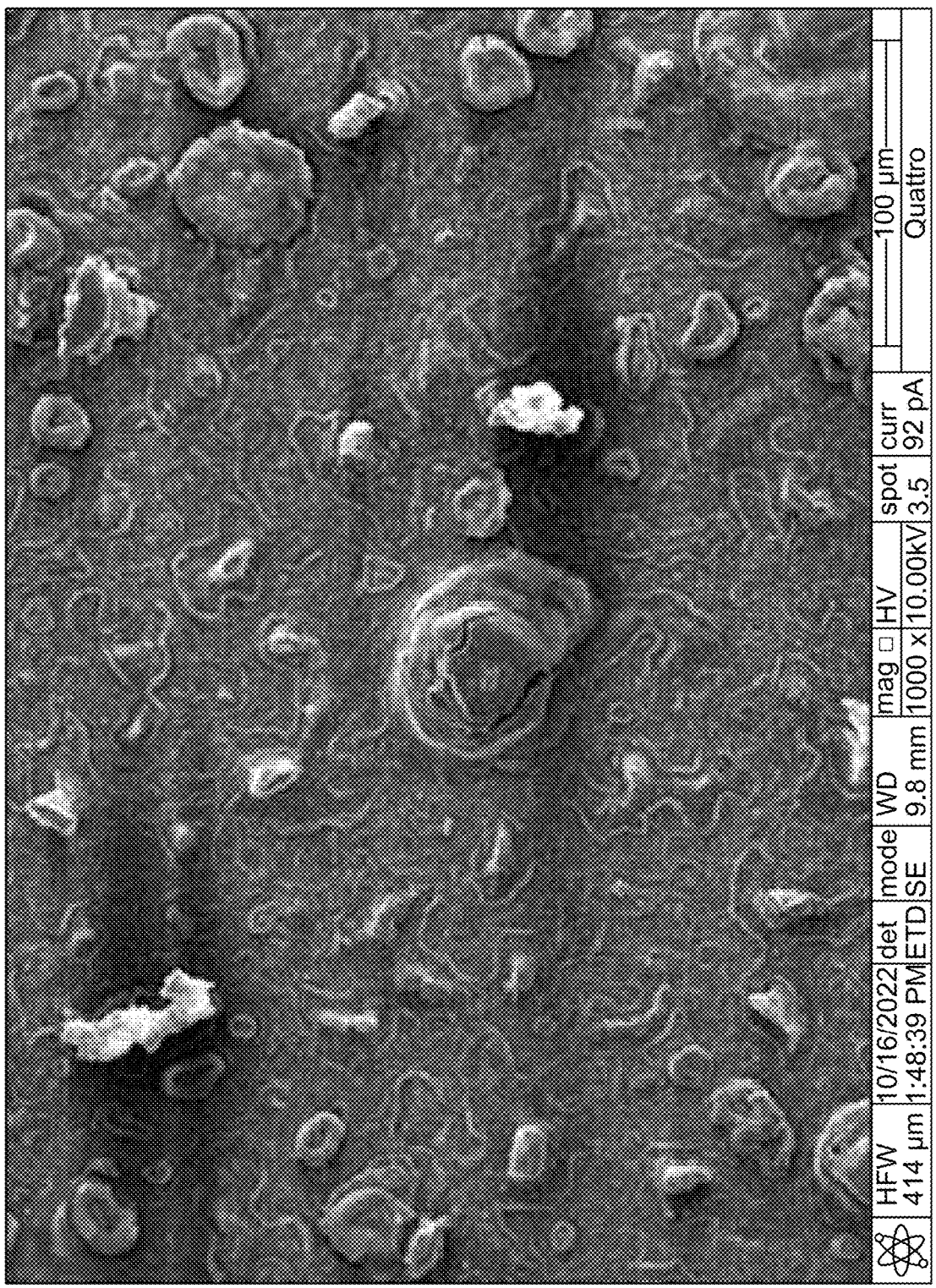
FIG. 9B depicts an SEM image of corroded C1018 CS surface in 1 molar (M) HCl in the absence of CMDDMDAC, according to certain embodiments.
Figure 9C:
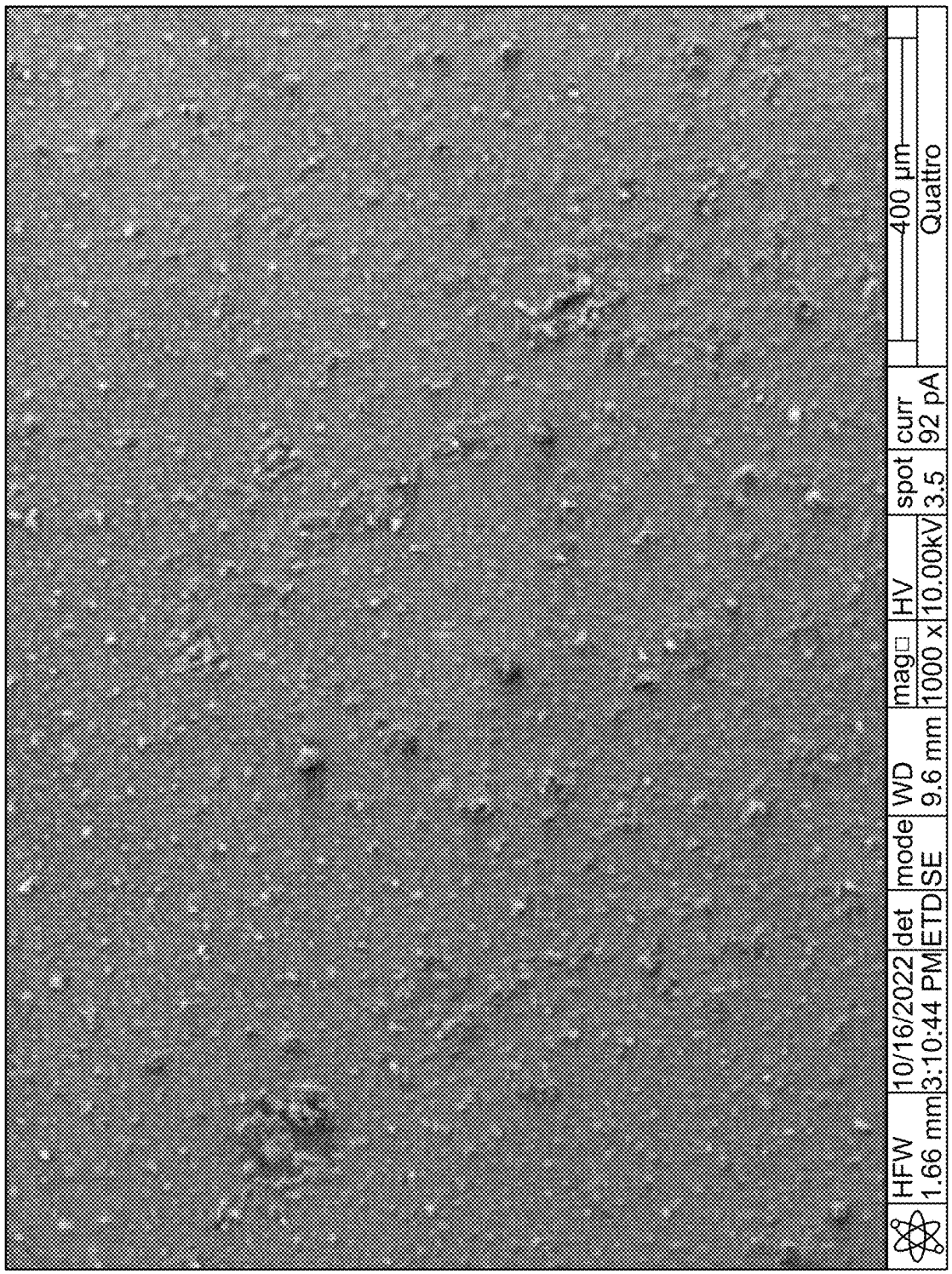
FIG. 9C depicts an SEM image of corroded C1018 CS surface in 1 M HCl in the presence of CMDDMDAC, according to certain embodiments.
Figures 10A, 10B:
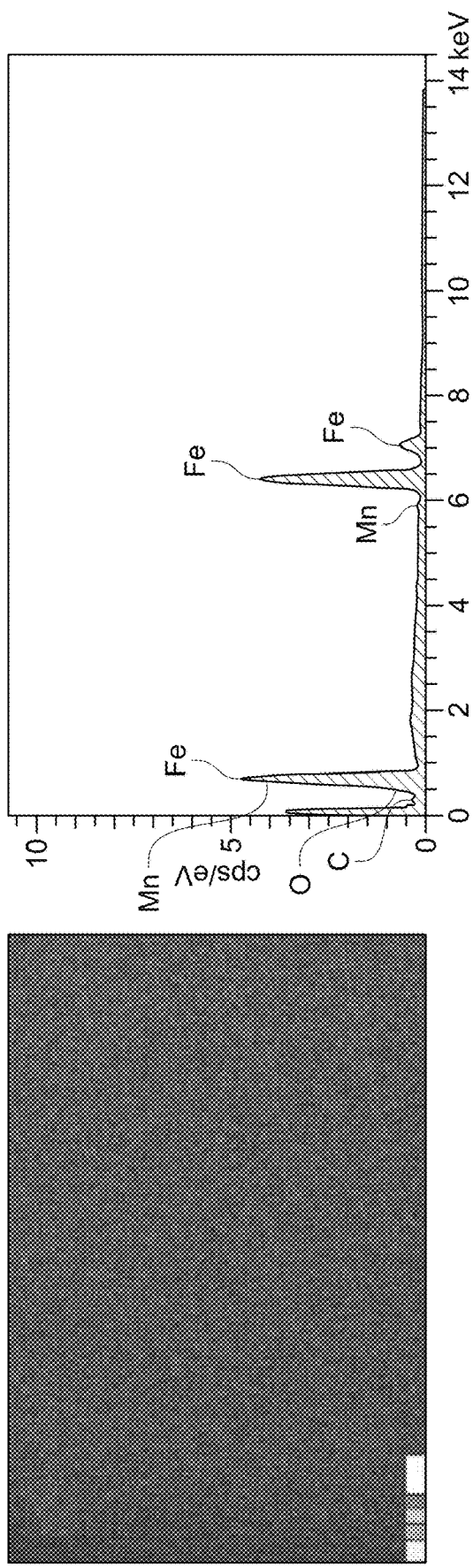
FIG. 10A depicts an energy-dispersive X-ray spectroscopy (EDX) mapping of the polished C1018 CS surface, according to certain embodiments.
FIG. 10B depicts an EDX spectra of the polished C1018 CS surface, according to certain embodiments.
Figure 10C:
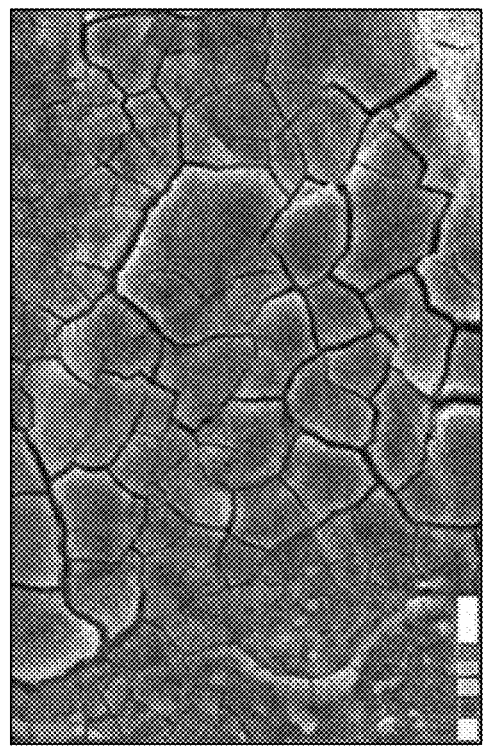
FIG. 10C depicts an EDX mapping of the corroded C1018 CS surface in 15% M HCl in the absence of CMDDMDAC, according to certain embodiments.
Figure 10D:
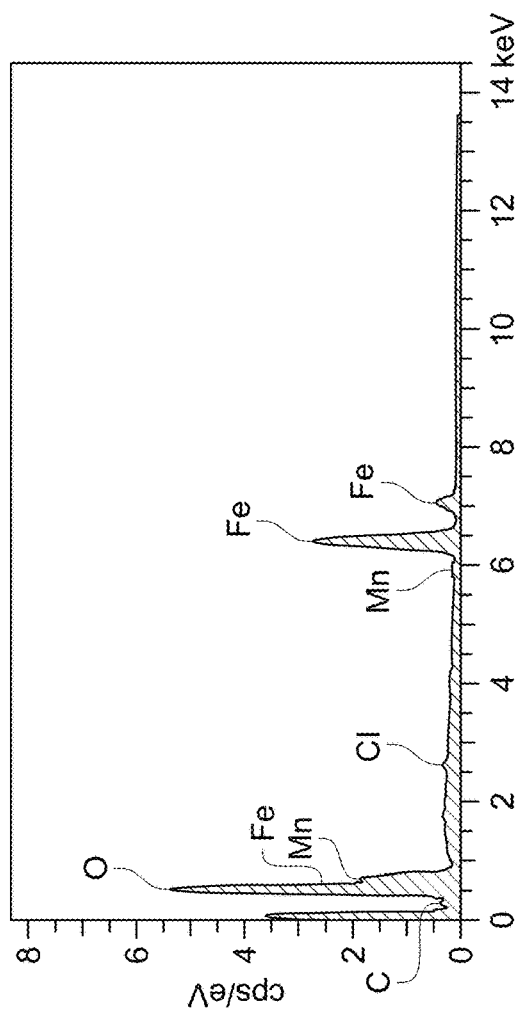
FIG. 10D depicts an EDX spectra of the corroded C1018 CS surface in 15% M HCl in the absence of CMDDMDAC, according to certain embodiments.
Figure 10F:
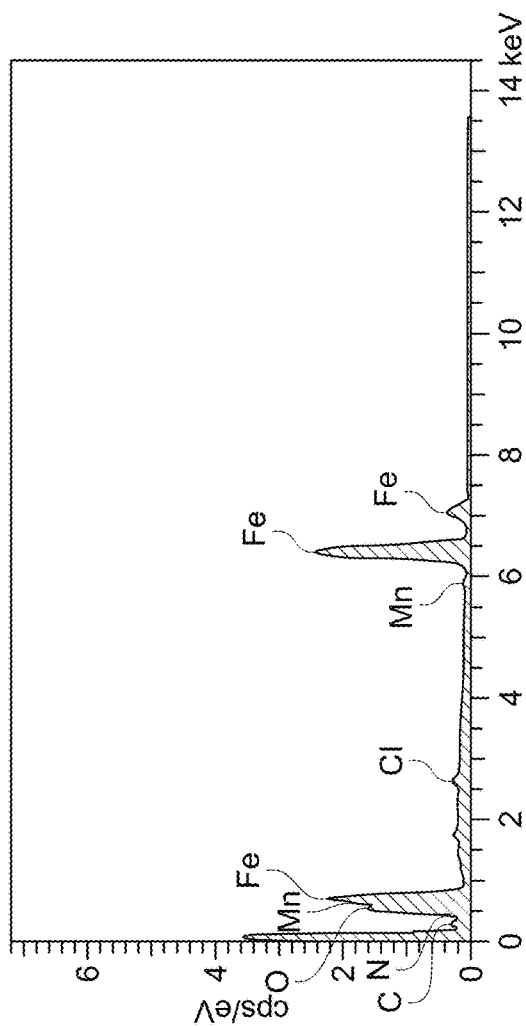
FIG. 10F depicts an EDX spectra of the corroded C1018 CS surface in 15% M HCl in the presence of CMDDMDAC, according to certain embodiments.
Figure 10E:
FIG. 10E depicts an EDX mapping of the corroded C1018 CS surface in 15% M HCl in the presence of CMDDMDAC, according to certain embodiments.

The acid includes at least one hydrochloric acid, sulfuric acid, nitric acid, phosphoric acid, boric acid, and citric acid. The acid is present in the solution at a concentration of from 0.05 to 30 wt. %, more preferably 12 to 18 wt. %, and yet more preferably 15 wt. % based on the total weight of the solution. The carbon steel includes 0.1-2.0 wt. %, more preferably 0.8-1.2 wt. %, and yet more preferably 1 wt. % Mn, 0.5-4.0 wt. %, more preferably 1.5-2 wt. %, and yet more preferably 1.9 wt. % O, 1.0-8.0 wt. %, more preferably 4.0-4.5 wt. %, and yet more preferably 4.4 wt. % C, and Fe as a balance, as determined by Energy-dispersive X-ray (EDX) spectroscopy. The method includes adding to the solution a corrosion inhibitor in an amount of 1 to 500, preferably 5 to 200, or more particularly 10 to 50 parts per million (ppm) based on the total number of parts by mass of the solution. The metal article adsorbs the corrosion inhibitor onto the surface of the metal article to form a barrier layer in the form of a composite. Referring to FIGS. 9B and 9C, the surface of the metal article containing the barrier layer has a smoother surface morphology compared to the surface of the metal article in contact with an acid solution without the presence of the corrosion inhibitor. In some embodiments, the barrier layer contains irregular shaped aggregates formed after contacting with the solution including the acid. In some embodiments, the aggregates have an average particle size in a range of 0.1 to 50 micrometers (μm), preferably 0.5 to 20 μm, preferably 1 to 10 μm, or even more preferably 3 to 5 μm. In some further embodiments, the barrier layer has an average thickness in a range of 10 to 1000 nanometers (nm), preferably 100 to 800 nm, preferably 200 to 600 nm, or even more preferably 300 to 400 nm. Other ranges are also possible.

In some embodiments, the corrosion inhibitor has a formula (I)

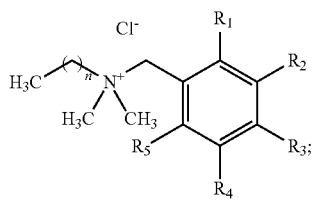

[I]

where n is any integer from 8 to 21 inclusive, and $R_1$, $R_2$, $R_3$, $R_4$, and $R_5$ are each independently selected from the group consisting of a hydrogen atom, a hydroxyl group, an optionally substituted alkyl, an optionally substituted cycloalkyl, and an optionally substituted alkoxy. In some embodiments, n is any integer from 8 to 12 inclusive. In some embodiments, $R_1$, $R_2$, $R_3$, $R_4$, and $R_5$ are each independently selected from the group consisting of a hydrogen atom, a chloromethyl group, a dichloromethyl group, a trichloromethyl group, a bromomethyl group, a dibromomethyl group, a tribromomethyl group, a fluoromethyl group, a difluoromethyl group, and a trifluoromethyl group. In some most preferred embodiments, n is 11. In some most preferred embodiments, $R_1$, $R_2$, $R_3$, $R_4$, and $R_5$ are each independently selected from the group consisting of a hydrogen atom, and a chloromethyl group.

In some embodiments, the corrosion inhibitor has a formula (II)

Formula [II]

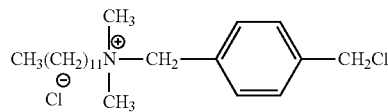

In some embodiments, the corrosion inhibitor is adsorbed onto the surface of the metal article via at least one interaction comprising a physisorption, a chemisorption, and a retro donation.

As used herein, the term "physisorption" generally refers to physical adsorption or van der Waals adsorption, is a process in which molecules or atoms are adsorbed onto the surface of a solid substance through weak intermolecular forces, such as van der Waals forces or London dispersion forces. In the present disclosure, the term "physisorption" may refer to an electrostatic attraction (interaction) of charged (protonated) molecules with previously existing chloride ions.

As used herein, the term "chemisorption" generally refers to a process in which molecules or atoms are adsorbed onto the surface of a solid substance through strong chemical bonds. It involves the formation of covalent or ionic bonds between the adsorbate (the substance being adsorbed) and the adsorbent (the surface of the solid). In the present disclosure, the term "chemisorption" refers to an interaction between π-electrons of the aromatic (phenyl ring) ring and vacant d-orbitals of Fe surface atoms. Additionally, the term "chemisorption," "chemical interaction," and "electrochemical interaction" may be used interchangeably.

As used herein, the term "retro donation" generally refers to backdonation or backbonding, is a chemical phenomenon in which electrons are transferred from a metal center to an adjacent ligand in a coordination complex. It involves the reverse of electron donation from the ligand to the metal, resulting in the flow of electron density from the metal to the ligand. In the present disclosure, the term "retro donation" may refer to an interaction of irons' d-electron with the vacant orbital of the corrosion inhibitor (retro donation).

In some embodiments, the corrosion inhibitor is adsorbed onto the surface of the metal article via a chemical interaction, an electrochemical interaction, or a combination thereof. In some embodiments, the chemical interaction includes at least one of chemical reaction, chemical bonding, chemical dissolution, chemical precipitation, chemical adsorption, chemical desorption, and chemical complexation. In some further embodiments, the chemical interaction is chemical bonding which involves the formation of chemical bonds between atoms or molecules of the metal article and molecules of the corrosion inhibitor. In some preferred embodiments, the chemical bonding includes covalent bonding, ionic bonding, and metallic bonding, hydrogen bonding, van der Waals forces, and dipole-dipole interactions. In some most preferred embodiments, iron atoms of the metal article are covalently bonded to the corrosion inhibitor. In some embodiments, the electrochemical interaction includes at least one of oxidation, reduction, ionization, and dissolution of the corrosion inhibitor in the acid containing solution. In some further embodiments, the electrochemical interaction occurs between the metal article surface and the surrounding environment that led to the deterioration of the metal.

The corrosion inhibitor is adsorbed onto the surface of the metal article at a temperature ranging from 303 to 333 kelvin (K), preferably 310 to 320 K, or even more preferably about 315 K. The metal article has a corrosion rate of less than 8, more preferably 3-4, and yet more preferably 3.74 millimeters per year (mm y$^{-1}$) in the solution, including the acid and the corrosion inhibitor. The metal article has an $E_{corr}$ IT value of from −420 to −390, more preferably −250 millivolts (mV) against the reversible hydrogen electrode ($V_{RHE}$). The method has an inhibition efficiency of 96 to 98% when the metal article is in contact with the solution at from 303 to 333 K, and the corrosion inhibitor is present in the solution in an amount of about 50 ppm based on the total number of parts of the solution.

In some embodiments, the solution may include, but are not limited to, surfactants, thickeners and/or viscosity modifiers, solubility modifiers, humectants, metal protecting agents, sequestrants and/or chelating agents, solidifying agent, sheeting agents, pH modifying components, including alkalinity and/or acidity sources, aesthetic enhancing agents (i.e., colorants, odorants, or perfumes), other cleaning agents, hydro tropes or couplers, and buffers.

The surfactant present in the solution may be non-ionic, anionic, cationic, or amphoteric. A non-ionic surfactant has no charged groups in its head. In some embodiments, the non-ionic surfactants may include alkanolamides of fatty acids, that is, amide reaction products between a fatty acid and an alkanolamine compound, such as coconut fatty acid monoethanolamide (e.g., N-methyl coco fatty ethanol amide), coconut fatty acid diethanolamide, oleic acid diethanolamide, and vegetable oil fatty acid diethanolamide. In some further embodiments, the non-ionic surfactants may include alkoxylated alkanolamides of fatty acids, preferably ethoxylated and/or propoxylated variants of the alkanolamides of fatty acids having anywhere from 2 to 30 EO and/or PO molar equivalents, preferably 3 to 15 EO and/or PO molar equivalents, preferably 4 to 10 EO and/or PO molar equivalents, preferably 5 to 8 EO and/or PO molar equivalents per moles of the alkanolamide of the fatty acid (e.g., coconut fatty acid monoethanolamide with 4 moles of ethylene oxide). In some preferred embodiments, the non-ionic surfactants may include amine oxides, such as N-cocoamidopropyl dimethyl amine oxide and dimethyl C6-C22 alkyl amine oxide (e.g., dimethyl coco amine oxide). In some further preferred embodiments, the non-ionic surfactants may include fatty esters, such as ethoxylated and/or propoxylated fatty acids (e.g., castor oil with 2 to 40 moles of ethylene oxide), alkoxylated glycerides (e.g., PEG-24 glyceryl monostearate), glycol esters and derivatives, monoglycerides, polyglyceryl esters, esters of polyalcohols, and sorbitan/sorbitol esters. In some even further preferred embodiments, the non-ionic surfactants may include ethers, such as (i) alkoxylated C1-C22 alkanols, which may include alkoxylated C1-C5 alkanols, preferably ethoxylated or propoxylated C1-C5 alkanols (e.g., dipropylene glycol n-butyl ether, tripropylene glycol n-butyl ether, dipropylene glycol methyl ether, tripropylene glycol methyl ether, diethylene glycol n-butyl ether, triethylene glycol n-butyl ether, diethylene glycol methyl ether, triethylene glycol methyl ether) and alkoxylated C6-C26 alkanols (including alkoxylated fatty alcohols), preferably alkoxylated C7-C22 alkanols, more preferably alkoxylated C8-C14 alkanols, preferably ethoxylated or propoxylated (e.g., cetyl stearyl alcohol with 2 to 40 moles of ethylene oxide, lauric alcohol with 2 to 40 moles of ethylene oxide, oleic alcohol with 2 to 40 moles of ethylene oxide, ethoxylated lanoline derivatives, laureth-3, ceteareth-6, ceteareth-11, ceteareth-15, ceteareth-16, ceteareth-17, ceteareth-18, ceteareth-20, ceteareth-23, ceteareth-25, ceteareth-27, ceteareth-28, ceteareth-30, isoceteth-20, laureth-9/myreth-9, and PPG-3 caprylyl ether), (ii) alkoxylated polysiloxanes, (iii) ethylene oxide/propylene oxide copolymers (e.g., PPG-1-PEG-9-lauryl glycol ether, PPG-12-buteth-16, PPG-3-buteth-5, PPG-5-buteth-7, PPG-7-buteth-10, PPG-9-buteth-12, PPG-12-buteth-16, PPG-15-buteth-20, PPG-20-buteth-30, PPG-28-buteth-35, and PPG-33-buteth-45), and (iv) alkoxylated alkylphenols.

Examples of surfactants include, but are not limited to, nonoxynol-9, poloxamers, tergitol, perfluorooctane sulfonate (PFOS), Pentax 99, benzalkonium chloride (BAC), cetylpyridinium chloride (CPC), and benzethonium chloride (BZT), betaines, and amino oxides.

In some embodiments, thickeners and/or viscosity modifiers include bauxite, bentonite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, halloysite, polysaccharide gelling agents (e.g., xanthan gum, scleroglucan, and diutan) as well as synthetic polymer gelling agents (e.g., polyacrylamides and co-polymers thereof), *psyllium* husk powder, hydroxyethyl cellulose, carboxymethylcellulose, and polyanionic cellulose, poly(diallyl amine), diallyl ketone, diallyl amine, styryl sulfonate, vinyl lactam, laponite. In some embodiments, the chelating agents as sequesteration agents of metal ions, include ethylene diamine tetraacetic acid (EDTA), diethylene triamine pentaacetic acid (DPTA), hydroxyethylene diamine triacetic acid (HEDTA), ethylene diamine di-ortho-hydroxy-phenyl acetic acid (EDDHA), ethylene diamine di-ortho-hydroxy-para-methyl phenyl acetic acid (EDDHMA), ethylene diamine di-ortho-hydroxy-para-carboxy-phenyl acetic acid (EDDCHA). In some embodiments, the stabilizing agents include polypropylene glycol, polyethylene glycol, carboxymethyl cellulose, hydroxyethyl cellulose, polysiloxane polyalkyl polyether copolymers, acrylic copolymers, alkali metal alginates and other water-soluble alginates, carboxyvinyl polymers, polyvinylpyrollidones, polyacrylates. In some embodiments, the dispersing agents include polymeric or co-polymeric compounds of polyacrylic acid, polyacrylic acid/maleic acid copolymers, styrene/maleic anhydride copolymers, polymethacrylic acid and polyaspartic acid. In some embodiments, the scale inhibitors include sodium hexametaphosphate, sodium tripolyphosphate, hydroxyethylidene diphosphonic acid, aminotris(methylenephosphonic acid (ATMP), vinyl sulfonic acid, allyl sulfonic acid, polycarboxylic acid polymers such as polymers containing 3-allyloxy-2-hydroxy-propionic acid monomers, sulfonated polymers such as vinyl monomers having a sulfonic acid group, polyacrylates and copolymers thereof. In some embodiments, the defoaming agents include silicone oils, silicone oil emulsions, organic defoamers, emulsions of organic defoamers, silicone-organic emulsions, silicone-glycol compounds, silicone/silica adducts, emulsions of silicone/silica adducts.

Aspects of the present invention are directed towards a method for inhibiting corrosion of a metal article in contact with a solution including an acid. The method includes adding to the solution a corrosion inhibitor, more preferably a quaternary surfactant, N-(4-chloromethylbenzyl)-N, N-dimethyldodecan-1-aminium chloride (CMDDMDAC). CMDDMDAC is characterized by various analytical techniques, such as nuclear magnetic resonance (NMR), Fourier transform infrared (FT-IR), and thermogravimetric analyses (TGA). CMDDMDAC is evaluated for its ability to prevent C1018 carbon steel (C1018 CS) from corroding under acidification (e.g., 15% HCl). Numerous techniques, including weight loss (WL), electrochemical (electrochemical impedance spectroscopy (EIS) and potentiodynamic polarization (PDP)), surface (scanning electron microscopy (SEM) and energy-dispersive X-ray spectroscopy (EDX), and density functional theory (DFT) methodologies, are used to examine corrosion inhibition capability of CMDDMDAC.

The thermostability of the corrosion inhibitor was characterized by thermal gravimetric analysis (TGA). TGA analysis is performed by using a thermogravimetric analyzer (SDT Q 600, TA Instruments, New Castle, USA). For the TGA analysis, the samples are measured by heating at an increment frequency of 5 to 20° C./min with the flow of nitrogen in a range of 25 to 150 mL/min, and a temperature of up to 1200° C. Other ranges are also possible.

Figure 3:
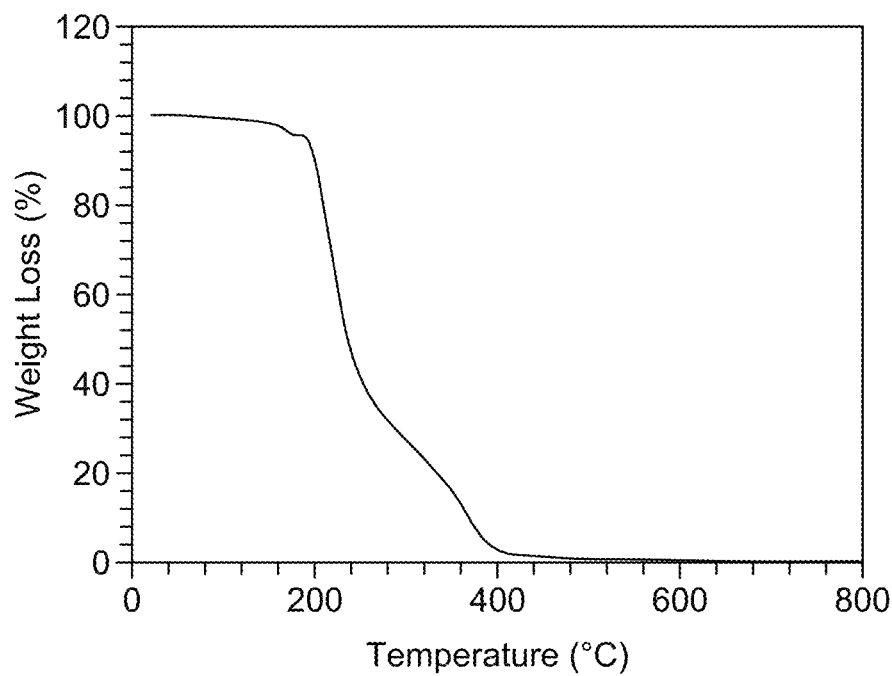
FIG. 3 depicts a thermogravimetric analyzer (TGA) curve of inhibitor molecule CMDDMDAC, according to certain embodiments.
Figure 6:
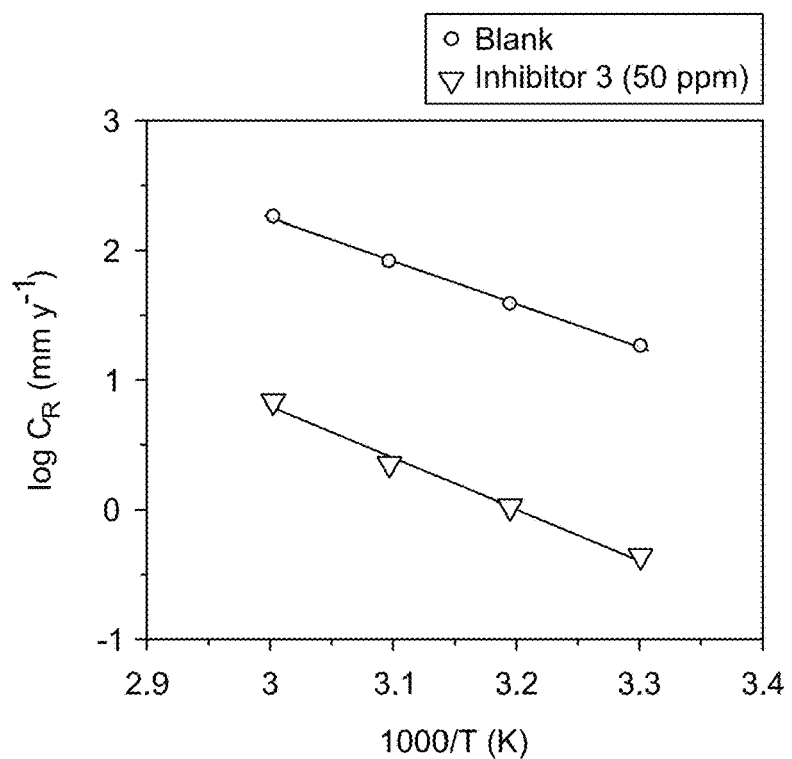
FIG. 6 depicts Arrhenius plots for C1018 carbon steel (CS) corrosion in 15% HCl in the absence and presence of CMDDMDAC, according to certain embodiments.

Referring to FIG. 3 a thermogravimetric analyzer (TGA) curve of the inhibitor molecule CMDDMDAC, in some embodiments, the CMDDMDAC has a mass loss of up to 20 wt. % based on an initial weight of the CMDDMDAC at a temperature of less than or equal to 200° C., as depicted in FIG. 6. In some further embodiments, the CMDDMDAC has a mass loss of up to 80 wt. % based on an initial weight of the CMDDMDAC at a temperature of less than or equal to 400° C., as depicted in FIG. 3. Other ranges are also possible. $^1H$ and $^{13}C$ NMR spectra were recorded on a 400 MHz spectrometer (Bruker AvanceIII) using the residual $D_2O$ protons (HOD) at δ 4.65 ppm and $^{13}C$ dioxane signal at δ 67.4 ppm as internal standards.

Figure 2A:
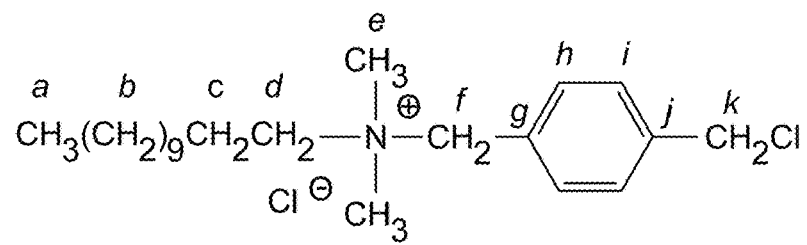
FIG. 2A depicts $^1$H nuclear magnetic resonance (NMR) spectra of N-dimethyldodecan-1-aminium chloride (CMDDMDAC) in $D_2O$, according to certain embodiments.
Figure 2A:
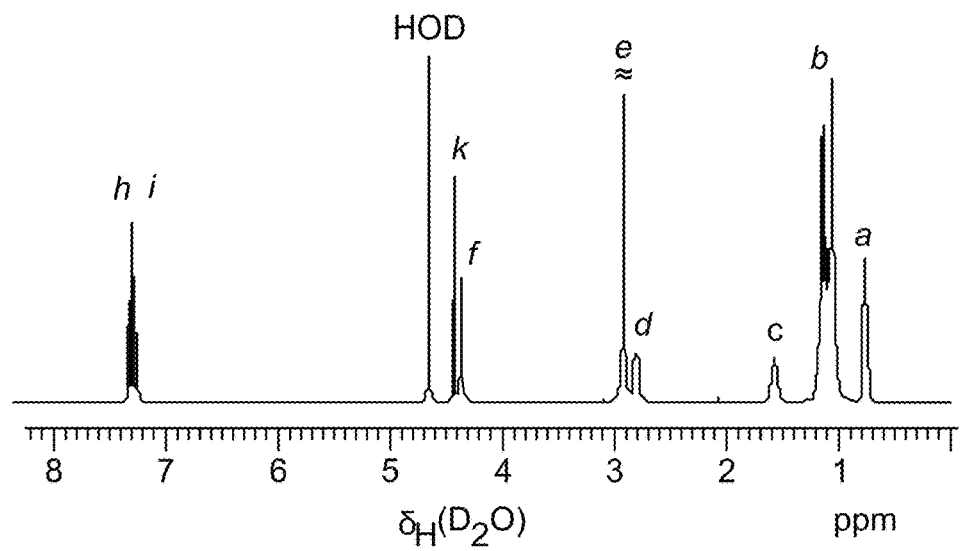

Referring to FIG. 2A, $^1H$ nuclear magnetic resonance (NMR) spectra of N-dimethyldodecan-1-aminium chloride (CMDDMDAC) in $D_2O$. In some embodiments, the CMDDMDAC has a first peak in a range of 0.5 to 0.9, or more preferably about 0.75; a second peak in a range of 0.9 to 1.5, or more preferably 0.9 to 1.2; a third peak in a range of 1.5 to 1.8, or more preferably about 1.57; a fourth peak in a range of 2.5 to 2.85, or more preferably about 2.83; a fifth peak in a range of 2.85 to 3, or even more preferably about 2.91; a sixth peak in a range of 4.1 to 4.4, or more preferably about 4.36; a seventh peak in a range of 4.4 to 4.6, or even more preferably about 4.43; an eighth peak in a range of 7.1 to 7.3, or more preferably about 7.27; a ninth peak in a range of 7.3 to 7.5, or even more preferably about 7.32, as depicted in FIG. 2A. Other ranges are also possible.

Figure 2B:
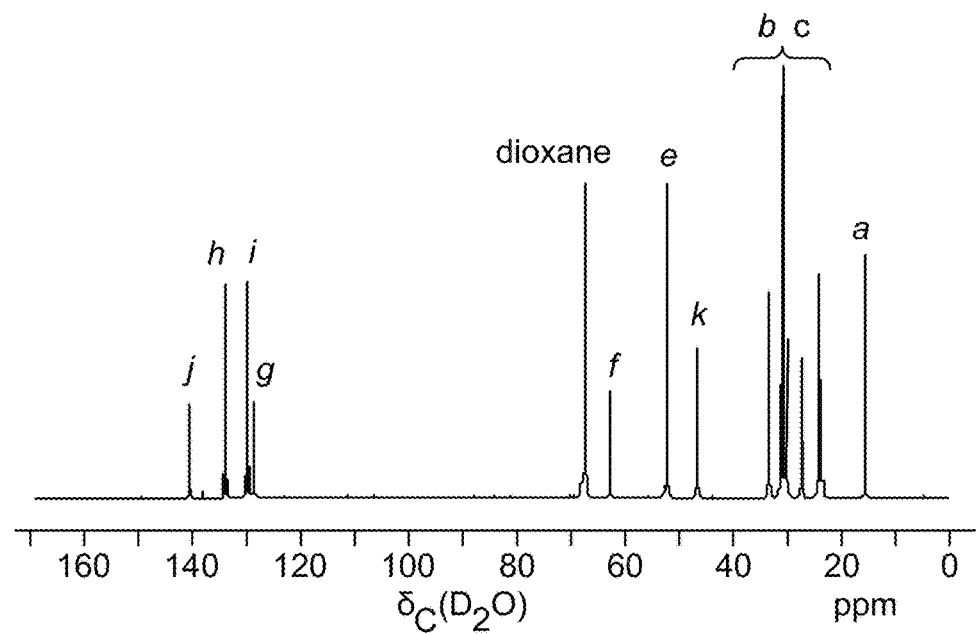
FIG. 2B depicts $^{13}$C NMR spectra of CMDDMDAC in $D_2O$, according to certain embodiments.

Referring to FIG. 2D, $^{12}D$ NMR spectra of N-dimethyldodecan-1-aminium chloride (CMDDMDAC) in $D_2O$. In some embodiments, the CMDDMDAC has a first peak in a range of 12 to 16, or more preferably about 14.73; a second peak in a range of 20 to 23, or more preferably about 22.99; a third peak in a range of 23 to 25, or more preferably about 23.51; a fourth peak in a range of 25 to 28, or more preferably about 26.74; a fifth peak in a range of 27 to 30, or even more preferably about 29.59; a sixth peak in a range of 30 to 30.5, or more preferably about 30.37; a seventh peak in a range of 30.5 to 31, or even more preferably about 30.67; an eighth peak in a range of 31 to 33, or more preferably about 32.83; a ninth peak in a range of 45 to 48, or even more preferably about 46.21; a tenth peak in a range of 48 to 54, or even more preferably about 51.74; an eleventh peak in a range of 60 to 65, or even more preferably about 62.44; a twelfth peak in a range of 65 to 69, or even more preferably about 67.08; a thirteenth peak in a range of 126 to 129, or even more preferably about 128.69; a fourteenth peak in a range of 129 to 131, or even more preferably about 129.83; a fifteenth peak in a range of 131 to 135, or even more preferably about 133.93; a sixteenth peak in a range of 138 to 142, or even more preferably about 140.56, as depicted in FIG. 2B. Other ranges are also possible.

The crystalline structures of the inhibitor molecule CMDDMDAC was characterized by the Fourier transform infrared spectra (FTIR). FTIR spectra were studied by using Fourier transform infrared spectra (Thermo-Scientific). For the Fourier transform infrared spectra characterization, the KBr discs of the samples were prepared by mixing and grounding the samples with KBr powder in mortar with pestle. The mixture was then shaped into discs under mechanical pressure. The samples discs are put into Fourier transform infrared spectra and spectral measurements were recorded in the wavenumber range of 500-4000 $cm^{-1}$. Prior to the above measurement, the samples are vacuum-dried at 60° C. for a duration of 24 h.

In some embodiments, the CMDDMDAC has a first intense peak in a range of 500 to 1500 $cm^{-1}$, a second intense peak in a range of 1600 to 1700 $cm^1$, a third intense peak in a range of 2800 to 3000 $cm^{-1}$, and a fourth intense peak in a range of 3000 to 3500 $cm^{-1}$ in an FTIR spectrum.

FIG. 1 illustrates a flow chart of a method 80 of preparing the corrosion inhibitor of formula (I). The order in which the method 80 is described is not intended to be construed as a limitation, and any number of the described method steps can be combined in any order to implement the method 80. Additionally, individual steps may be removed or skipped from the method 80 without departing from the spirit and scope of the present disclosure.

At step 82, the method 80 includes mixing an alkylamine and a substituted benzyl halide in a solvent to form a mixture. The alkylamine includes an aliphatic carbon chain having from 9 to 22 carbons, preferably 10 to 17 carbons, or even more preferably 11 to 12 carbons. The substituted benzyl halide includes at least one of 1,3-bis(chloromethyl)benzene, 1,4-bis(chloromethyl)benzene, and 1,2-bis(chloromethyl)benzene. In some preferred embodiments, the substituted benzyl halide is 1,4-bis(chloromethyl)benzene. In some further embodiments, a mole ratio of the alkylamine to the substituted benzyl halide ranges from 1:1 to 1:10, preferably 1:2 to 1:8, preferably 1:3 to 1:6, or even more preferably 1:4 to 1:5. Other ranges are also possible. The solvent is at least one of acetonitrile, N-methyl-pyrrolidone, propylene carbonate, and dimethylsulfoxide. The solvent may include, but are not limited to, methanol, ethanol, isopropanol, octanol, ethylene glycol, propylene glycol, glycol ethers, e.g., ethylene glycol monobutyl ether (EGMBE), toluene, xylene, various aromatic solvents, and naphtha. In some embodiments, the solvent may be a mixture of toluene or xylene with methanol.

At step 84, the method 80 includes heating the mixture to precipitate the corrosion inhibitor from a first mixture. The mixture is heated to a temperature range of 50-70° C., preferably 60-70° C., and more preferably to 65° C., for 5-20 hours, preferably 10-15 hours, more preferably 12 hours, to form the first mixture.

At step 86, the method 80 includes removing the precipitate from the first mixture, washing, and drying. The precipitate may be removed by filtration or by any of the methods known in art. The precipitate is further washed with an alcoholic solvent, such as ethanol. The washed precipitate is further dried to remove moisture. In some embodiments, the moisture may be removed using acetone. The precipitate can be dried using heating appliances such as ovens, microwaves, autoclaves, hot plates, heating mantles and tapes, oil baths, salt baths, sand baths, and air baths, hot-tube furnaces, and hot-air guns.

In some embodiments, at 50 parts per million (ppm) concentration, CMDDMDAC displays inhibitory efficiency of 99.25% (EIS data). Weight loss study manifests the inhibition efficiencies of 97.63%, 97.33%, 97.31%, and 96.16% at 303, 313, 323, and 333 K, respectively, validating that CMDDMDAC is a high-temperature corrosion inhibitor. WL investigation shows that CMDDMDAC becomes active by adhering to the C1018 CS/15% HCl interface, and its adsorption follows the Langmuir isotherm. EIS and PDP tests show that CMDDMDAC acts as an interface- and mixed-type inhibitor. Effectively adhering to the interface of C1018 CS and 15% HCl, CMDDMDAC prevents the active sites that cause corrosion and assembles a barrier to the charge transfer process. SEM and EDS results show the adsorption mechanism of CMDDMDAC. According to DFT-based computational studies, quaternary nitrogen and bis(chloromethyl)benzene impact the charge sharing with the C1018 CS surface, and the corrosion inhibition potential of dodecylamine and 1,4-bis(chloromethyl)benzene is amplified in CMDDMDAC.

EXAMPLES

The following examples describe and demonstrate exemplary embodiments of the method for inhibiting corrosion of the metal article with a corrosion inhibitor, as described herein. The examples are provided solely for the purpose of illustration and are not to be construed as limitations of the present disclosure, as many variations thereof are possible without departing from the spirit and scope of the present disclosure.

Example 1: Materials and Methods

Dodecylamine and 1,4-bis(chloromethyl)benzene were purchased from Fluka Chemie AG and used as received. To conduct weight loss, electrochemical, and surface experiments for the corrosion study, C1018 carbon steel (C1018 CS) pieces having a dimension of 3.8 cm×0.2 cm×2.1 cm and elemental composition of Mn; 0.75, C; 0.18, S; 0.05, P; 0.04, and Fe (balance) was used. Before entering the trials, C1018 CS specimens were deliberately abrasive blasted with several grades of silicon carbide papers with a mesh size ranging from 120 to 1200. Sandblasted coupons were sonicated in an ethanol bath for 10 minutes to remove grinding remnants. Coupons were dried with warm air after being washed with acetone to remove the moisture. For the present disclosure, a corrosive medium (15% HCl) was made by dissolving concentrated HCl (37%) with purified water. The studied surfactant (CMDDMDAC) was dissolved promptly in 15% HCl to create a stock solution. The stock solution was diluted with 15% HCl to prepare 2-50 ppm examined concentrations.

Elemental analyses were performed using a Perkin Elmer instrument (Model 2400, 940 Winter Street Waltham, MA 02451 U.S.A). Melting points are recorded in a calibrated Electrothermal-SMP30-digital melting point apparatus, Staffordshire, ST15 0SA, UK, using 1 degree Celsius per minute (° C./min) heating rates near the melting points. TGA under $N_2$ was performed by an SDT analyzer (Q600: TA Instruments, 159 Lukens Dr, New Castle, DE 19720, USA). FT-IR spectra (Transmittance mode) of the synthesized materials were recorded by a Thermo Scientific Nicolet iS10 spectrometer (manufactured by ThermoFisher Scientific, 168 Third Avenue. Waltham, MA USA 02451) and are reported in wave numbers (cm$^{-1}$) (Spectral resolution: 4 cm$^{-1}$; the number of scans: 64). $^1$H and $^{13}$C NMR spectra were recorded in a 400-megahertz (MHz) spectrometer (Bruker AvanceIII, 40 Manning Road Billerica, MA 01821, United States of America) using the residual $D_2O$ protons (HOD) at δ 4.65 ppm and $^{13}$C dioxane signal at δ 67.4 ppm as internal standards.

Example 2: Synthesis of Quaternary Ammonium Salt 3: N-(4-Chloromethylbenzyl)-N, N-Dimethyldodecan-1-Aminium Chloride (CMDDMDAC)

A solution of dodecylamine (90%) 1 (14.2 grams (g), 60 millimoles (mmol)) and 1,4-Bis(chloromethyl)benzene 2 (43.8 g, 250 mmol) in acetonitrile (100 milliliters (mL)) was stirred at 65° C. for 12 h. After removal of the solvent, the residual solid was triturated with liberal excess of pentane to remove unreacted 1,4-bis(chloromethyl)benzene 2 (which can be recovered and reused). The remaining solid was dissolved in hot acetone (150 mL) and allowed to crystallize at room temperature to obtain quaternary ammonium salt 3 as white crystals (19.4 g, 83%). M·p 73-75° C. Elemental analysis: Found C 67.8; H 10.2; N 3.5%. $C_{22}H_{39}Cl_2N$ requires C 68.02; H 10.12; N 3.61%); $v_{max}$ (KBr): 3450, 3022, 2922, 2855, 1622, 1475, 1382, 1324, 1270, 1218, 1128, 1060, 1001, 894, 833, 790, 725, 673, and 527 cm$^{-1}$; δH ($D_2O$) 0.75 (3H, t, J 6.6 Hz), 0.90-1.20 (18H, m), 1.57 (2H, m), 2.83 (2H, m), 2.91 (6H, s), 4.36 (2H, m), 4.43 (2H, m), 7.27 (2H, d, J7.6 Hz), 7.32 (2H, d, J 7.6 Hz), (HOD) signal appeared at δ 4.65 ppm); $δ_C$ ($D_2O$) 14.73 (1C), 22.99 (1C), 23.51 (1C), 26.74 (1C), 29.59 (1C), 30.37 (3C), 30.67 (2C), 32.83 (1C), 46.21 (1C), 51.74 (2C), 62.44 (1C), 67.08 (1C), 128.69 (1C), 129.83 (2C), 133.93 (2C), 140.56 (1C), (dioxane 67.4).

Example 3: Weight Loss Studies

The weight loss experiment was carried out in a 250 mL Wheaton bottle, with 200 mL of 15% HCl and various concentrations (2-50 ppm) of CMDDMDAC for a 3-hour immersion period. The specimens were removed once the allotted time had passed and cleaned in running water before being treated with acetone and dried in heated air. The dried specimen's weight was determined and noted. The difference between the original and final weights was used to calculate the weight losses of specimens. The corrosion rate ($C_R$) and associated inhibition efficiency ($\eta_{WL\ \%}$%) were calculated using the following equations [N. A. Odewunmi, M. A. Mazumder, S. A. Ali, Tipping Effect of Tetra-alkylammonium on the Potency of N-(6-(1H-benzo [d] imidazol-1-yl) hexyl)-N, N-dimethyldodecan-1-aminium bromide (BIDAB) as Corrosion Inhibitor of Austenitic 304 L Stainless Steel in Oil and Gas Acidization: Experimental and DFT Approach, Journal of Molecular Liquids, (2022) 119431; and D. S. Chauhan, M. A. Quraishi, M. A. J. Mazumder, S. A. Ali, N. A. Aljeaban, B. G. Alharbi, Design and synthesis of a novel corrosion inhibitor embedded with quaternary ammonium, amide and amine motifs for protection of carbon steel in 1 M HCl, Journal of Molecular Liquids, 317 (2020) 113917, each of which is incorporated herein by reference in their entirety]:

$$C_R(mmy^{-1}) = \frac{87600 \times (W_i - W_f)}{\rho A T} \quad (1)$$

$$\eta_{WL\%} = \frac{C_{R(0)} - C_{R(i)}}{C_{R(0)}} \times 100 \quad (2)$$

In the above equations, $W_i$, $W_f$, ρ, A, and T represent the initial specimen weight, final specimen weight, the density of carbon steel, exposed surface area, and immersion time (3 h), respectively. $C_{R(0)}$ and $C_{R(i)}$ reflect the corrosion rates in the absence and presence of CMDDMDAC, respectively.

Example 4: Electrochemical (PDP and EIS) Studies

Electrochemical experiments were conducted using the Gamry Potentiostat/Galvanostat/ZRA (Reference-3000-40162, manufactured by Gamry Instruments, 734 Louis Dr, Warminster, PA 18974, United States) version 7.8.2 Build 7430 workstation. A three-electrode single-compartment electrochemical set-up was adopted to handle flat specimens of various sizes with an exposed surface of 1 centimeter square (cm$^2$). Reference, working, and counter electrodes in the present setup used are a saturated calomel, C1018CS, and graphite rod. After the system reached its steady state potential, electrochemical tests were conducted. EIS tests used a frequency range of 100 kilohertz (kHz) to 10 millihertz (mHz) and a peak-to-peak amplitude of 5 mV. The values of charge transfer resistance (Rct) and other pertinent EIS parameters were determined by fitting the Nyquist curves in an appropriate equivalent circuit. Based on the $R_{ct}$ values, the corrosion inhibition efficiency ($\eta_{EIS\%}$) at various concentrations of CMDDMDAC was calculated using equation (3). Polarization resistance ($R_p$), which encompasses a number of resistances such as film resistance ($R_f$), pore resistance ($R_{pore}$), and $R_{ct}$, was also used to estimate the inhibition efficiency ($\eta_{LPR\%}$) of CMDDMDAC at its varied concentrations. Equation (4) was employed to calculate the $\eta_{LPR\%}$ using the linear polarization method. Tafel curves for C1018CS corrosion in 15% HCl with and without CMDDMDAC were retrieved for the potentiodynamic polarization experiment at ±250 mV vs. open-circuit voltage (OCV) at a 0.5 millivolts per second (mV s$^{-1}$) scan rate. To obtain the values of corrosion current density ($i_{corr}$), Tafel slopes ($\beta_a$ and $\beta c$), and corrosion potential ($E_{corr}$), the straight portions of both anodic and cathodic Tafel curves were extrapolated. The corrosion inhibition efficiency ($\eta_{PDP\%}$) was calculated using the $i_{corr}$ values following equation (5).

$$\eta_{PDP\%} = \frac{i_{corr}^0 - i_{corr}^i}{i_{corr}^0} \times 10 \quad (3)$$

$$\eta_{LPR\%} = \frac{R_p^i - R_p^0}{R_p^i} \times 100 \quad (4)$$

$$\eta_{EIS\%} = \frac{R_{ct}^i - R_{ct}^0}{R_{ct}^i} \times 100 \quad (5)$$

In the above equations, $i_{corr}$, $R_p$, and $R_{ct}$ represent the corrosion current density, polarization resistance, and charge transfer resistance, respectively. The superscript '0' and 'i' represent the absence and presence of CMDDMDAC, respectively.

Example 5: Surface (SEM and EDX) Studies

For SEM and EDX studies, Quattro ESEM-FEG (EDX, Oxford Instruments, Abingdon OX13 5QX, UK) from ThermoFisher™ Scientific was used. The C1018 CS specimens were sliced into squares of 1 cm by 1 cm and submerged in 15% HCl for three hours in the absence and presence of the optimal concentration (50 ppm) of CMDDMDAC. Before being completely immersed in 15% HCl solution, the specimens were meticulously abraded with silicon carbide paper of various grades (120-1200 mess size), sonicated in an ethyl alcohol bath, cleaned with acetone, and dried in warm air. The C1018 CS coupons were taken out after 3 hours and dried in a cold air stream before being submitted for SEM and EDX investigations. For surface, morphological, and elemental analyses over the metal surface, SEM images and EDX spectra of specimens were recorded, respectively.

Example 6: DFT-Based Computational Studies

DFT-based computational research for CMDDMDAC and its constituent parts in the gas and aqueous phases was conducted using Gaussian 09 software. The Becke 3-parameter hybrid functional and the Lee-Yang-Paar correlation functional, or B3LYP, were chosen for the experiment. All computations used the premise of 6-31+G. (d, p). The following relationships (equations. 6-12) were used to derive the various DFT parameters [I. Obot, D. Macdonald, Z. Gasem, Density functional theory (DFT) as a powerful tool for designing new organic corrosion inhibitors. Part 1: an overview, Corrosion Science, 99 (2015) 1-30; C. Fu, C. Liu, T. Li, X. Zhang, F. Wang, J. Yang, Y. Jiang, P. Cui, H. Li, DFT calculations: A powerful tool for better understanding of electrocatalytic oxygen reduction reactions on Pt-based metallic catalysts, Computational Materials Science, 170 (2019) 109202; E. E. Ebenso, C. Verma, L. O. Olasunkanmi, E. D. Akpan, D. K. Verma, H. Lgaz, L. Guo, S. Kaya, M. A. Quraishi, Molecular modelling of compounds used for corrosion inhibition studies: a review, Physical Chemistry Chemical Physics, (2021); D. K. Verma, R. Aslam, J. Aslam, M. Quraishi, E. E. Ebenso, C. Verma, Computational modeling: theoretical predictive tools for designing of potential organic corrosion inhibitors, Journal of Molecular Structure, 1236 (2021) 130294; Y. Ma, T. Zhou, W. Zhu, B. Fan, H. Liu, G. Fan, H. Hao, H. Sun, B. Yang, Understanding the anticorrosive mechanism of a cross-linked supramolecular polymer for mild steel in the condensate water: comprehensive experimental, molecular docking, and molecular dynamics investigations, Journal of Molecular Modeling, 26 (2020) 1-17; and D. Li, X. Zhao, Z. Liu, H. Liu, B. Fan, B. Yang, X. Zheng, W. Li, H. Zou, Synergetic anticorrosion mechanism of main constituents in chinese yam peel for copper in artificial seawater, ACS omega, 6 (2021) 29965-29981, each of which is incorporated herein by reference in their entirety]:

$$IP = -E_{HOMO} \quad (6)$$

$$EA = -E_{LUMO} \quad (7)$$

$$\Delta E = E_{LUMO} - E_{HOMO} \quad (8)$$

$$\eta = \frac{1}{2}(E_{LUMO} - E_{HOMO}) \quad (9)$$

$$\sigma = \frac{1}{\eta} \quad (10)$$

$$\chi = -\frac{1}{2}(E_{LUMO} + E_{HOMO}) \quad (11)$$

$$\Delta N = \left(\frac{\chi_{Fe} - \chi_{inh}}{2(\eta_{Fe} + \eta_{inh})}\right) \quad (12)$$

IP is the ionization potential, EA is the electron affinity, ΔE is the energy band gap ($E_{LUMO}$–$E_{HOMO}$), η is the hardness, σ is the softness, χ is the electronegativity, and ΔN is the fraction of electron transfer.

Example 7: Synthesis and Characterization of Quaternary Ammonium Salt 3 (CMDDMDAC)

The synthesis of CMDDMDAC, obtained in about 83% yield, was carried out as outlined in Scheme 1. $^1$H and $^{13}$C NMR spectra (FIGS. 2A-2B), along with elemental analysis, confirmed the structure of the inhibitor molecule.

Scheme 1. Synthesis of CMDDMDAC

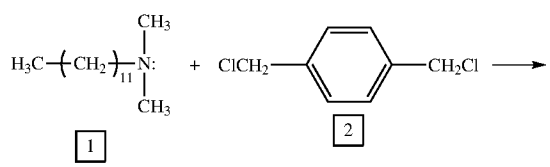

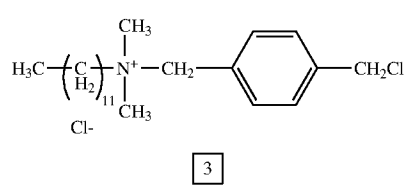

TGA curve for inhibitor molecule CMDDMDAC shown in FIG. 3 revealed a loss of 5% up to 195° C. attributed to the removal of moisture. Two major losses of 60 and 35% in the respective temperature range 195-270° C. and 270-400° C. can be accounted for the removal of alkyl and aromatic motifs. Overall, the TGA revealed the thermal stability of the inhibitor up to 200° C.

Example 8: Corrosion Inhibition Potential of CMDDMDAC

Weight Loss Study

Figure 4A:
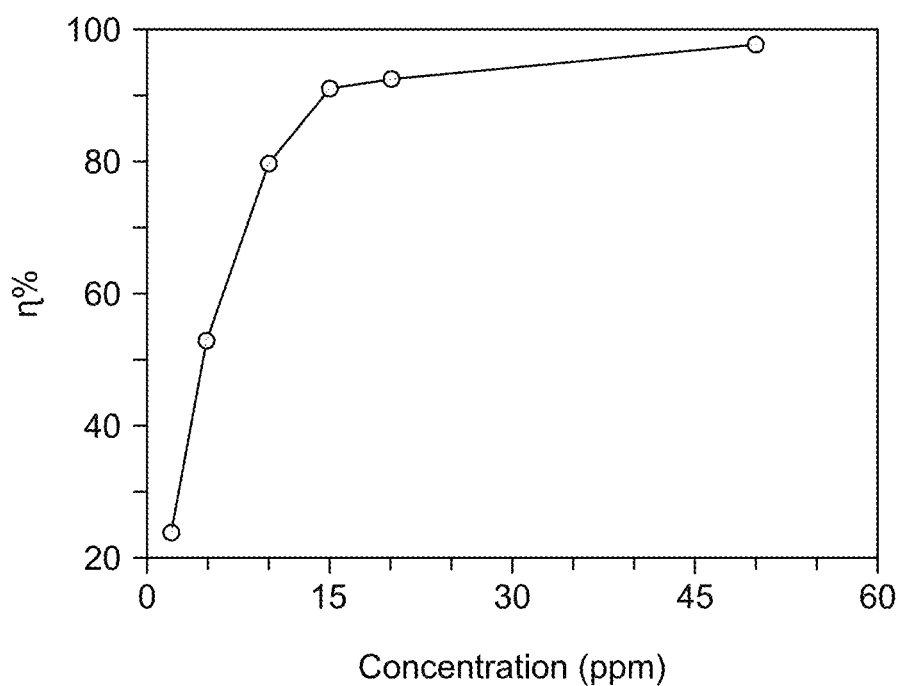
FIG. 4A depicts the effect of concentration on corrosion inhibition efficiency, according to certain embodiments.
Figure 4B:
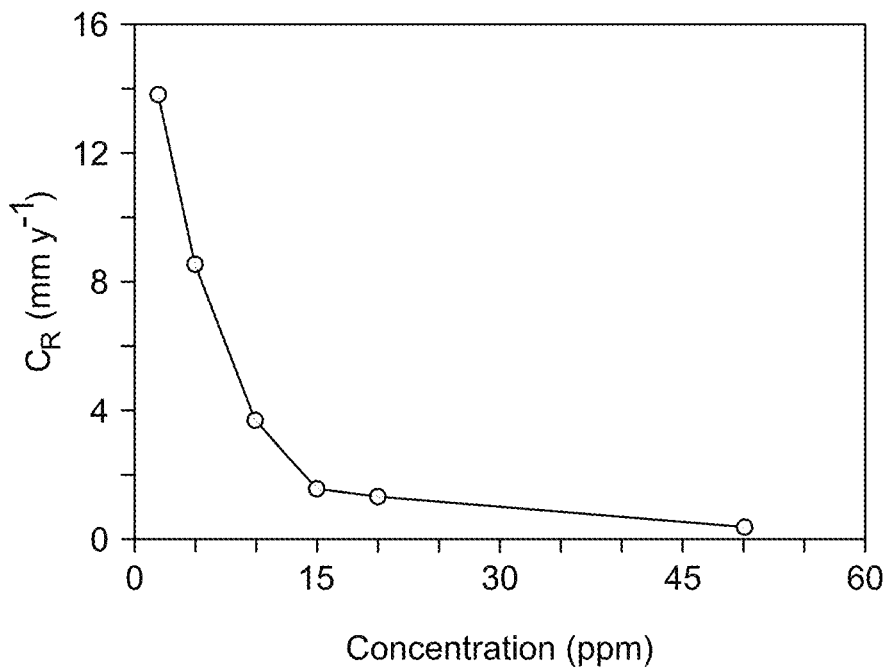
FIG. 4B depicts the effect of concentration on corrosion rate of CMDDMDAC at 303 kelvin (K), according to certain embodiments.

Weight loss is one of the most widely used quantitative techniques for evaluating and tracking interior or exterior corrosion. Limited to time and weight, this is one of the most straightforward corrosion monitoring systems. The mass loss of the specimen being studied (with the known surface area) is calculated by comparing its weight before and after being submerged in a corrosive liquid over a predetermined period (3 h in the present disclosure). This technique, also known as immersion testing, is used to quantify the CRs. The results of the weight loss approach for C1018 CS corrosion in 15% HCl at 30° C. at various concentrations of CMDDMDAC (2-50 ppm) are presented in Table 1 and FIGS. 4A-4C. As shown in Table 1 and FIG. 4A, as CMDDMDAC concentrations increase, inhibition efficiency increases as well, indicating that more species of CMDDMDAC have been adsorbed on the surface, increasing the surface coverage [H. Jafari, M. Rezaeivala, N. Mokhtarian, A. Berisha, E. Ameri, Corrosion inhibition of carbon steel in 0.5 M H2SO4 by new reduced Schiff base ligand, Journal of Bio- and Tribo-Corrosion, 8 (2022) 1-13; and R. Yildiz, Adsorption and inhibition effect of 2, 4-diamino-6-hydroxy-pyrimidine for mild steel corrosion in HCl medium: experimental and theoretical investigation, Ionics, 25 (2019) 859-870, each of which is incorporated herein by reference in their entirety]. At a concentration of 50 ppm, CMDDMDAC exhibits its most remarkable inhibitory efficacy of 97.63%. Furthermore, the outcomes also show that the inclusion of CMDDMDAC in the 15% HCl reduced the corrosion rate ($C_R$), which is ascribed to an increase in the level of CMDDMDAC surface coverage on the steel surface (FIG. 4B).

TABLE 1

The weight loss method results for C1018 CS corrosion with and without varying amounts of CMDDMDAC in 15% HCl (3 h, 303 K).

| Sample | Conc. (ppm) | $C_R$ (mm y$^{-1}$) | Surface coverage (θ) | ηWL % |
|---|---|---|---|---|
| Blank | — | 18.2 | — | — |
| CMDDMDAC | 2 | 13.89 | 0.2368 | 23.68 |
|  | 5 | 8.61 | 0.5269 | 52.69 |
|  | 10 | 3.74 | 0.7945 | 79.45 |
|  | 15 | 1.63 | 0.9104 | 91.04 |
|  | 20 | 1.38 | 0.9241 | 92.41 |
|  | 50 | 0.43 | 0.9763 | 97.63 |

The most critical understanding of the interactions between inhibitors and metal surfaces comes from adsorption isotherm models [E. Ituen, O. Akaranta, A. James, Evaluation of performance of corrosion inhibitors using adsorption isotherm models: an overview, Chem. Sci. Int. J, 18 (2017) 1-34; and S. Adejo, M. Ekwenchib, J. Gbertyoa, T. Menengea, J. Ogbodoc, Determination of adsorption Isotherm model best fit for methanol leaf extract of Securinega virosa as corrosion inhibitor for corrosion of mild steel in HCl, Journal: Journal of Advances in Chemistry, 10 (2014), each of which is incorporated herein by reference in their entirety]. The best adsorption isotherm mode was determined in the current investigation by plotting the surface coverage (θ) values of CMDDMDAC against its concentrations. The Langmuir isotherm was shown to be the best fit out of several isotherms examined, including Frumkin, Temkin, Langmuir, and Freundlich [D. S. Chauhan, M. Quraishi, A. Qurashi, Recent trends in environmentally sustainable Sweet corrosion inhibitors, Journal of Molecular Liquids, 326 (2021) 115117; C. Verma, M. A. Quraishi, K. Kluza, M. Makowska-Janusik, L. O. Olasunkanmi, E. E. Ebenso, Corrosion inhibition of mild steel in 1M HCl by D-glucose derivatives of dihydropyrido [2, 3-d: 6, 5-d'] dipyrimidine-2, 4, 6, 8 (1H, 3H, 5H, 7H)-tetraone, Scientific Reports, 7 (2017) 1-17; and C. Verma, L. O. Olasunkanmi, E. E. Ebenso, M. A. Quraishi, I. B. Obot, Adsorption behavior of glucosamine-based, pyrimidine-fused heterocycles as green corrosion inhibitors for mild steel: experimental and theoretical studies, The Journal of Physical Chemistry C, 120 (2016) 11598-11611, each of which is incorporated herein by reference in their entirety]. The Langmuir adsorption isotherm can be best represented by equation. 13:

$$K_{ads}C = \frac{\theta}{1-\theta} \tag{13}$$

Figure 4C:
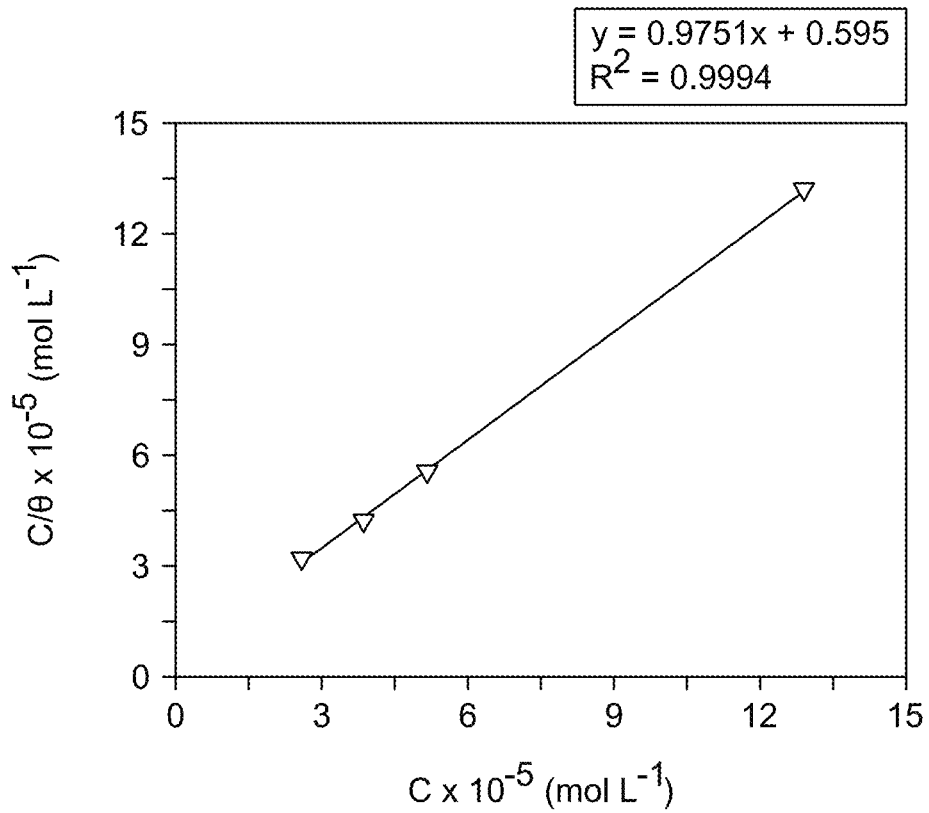
FIG. 4C depicts Langmuir adsorption isotherm for adsorption of CMDDMDAC, according to certain embodiments.

In the above equation, C, θ and $K_{ads}$ represent the concentration of CMDDMDAC, surface coverage, and equilibrium constant for the adsorption-desorption process of CMDDMDAC. The Langmuir isotherm provides a straight line between C/θ and C (FIG. 4C).

Free energy of adsorption ($\Delta G_{ads}$) values were computed using equation (14). In this equation, the quantity 55.5 stands for the molar concentration of water in the acid solution:

$$\Delta G^0_{ads} = -RT\ln(55.5K_{ads}) \tag{14}$$

where R is the universal gas constant, and T is the absolute temperature. Table 2 provides the derived $K_{ads}$ and $\Delta G_{ads}$ values. Generally, the $K_{ads}$ value reflects the inhibitor's propensity for adsorption on metallic surfaces. High inhibitory effectiveness and adsorption inclination are correlated with high $K_{ads}$ values. A high value of $K_{ads}$ ($1.68 \times 10^5$ liters per mole (L mol$^{-1}$)) indicates that CMDDMDAC adsorption can strongly adsorb on the C1018 CS surface in 15% HCl. A value of $\Delta G_{ads}$ of −20 kilojoules per mole (kJ mol$^{-1}$) or less negative is connected to electrostatic interactions between the inhibitor molecules and the metallic surface. On the other hand, a value of $\Delta G_{ads}$ of −40 kJ mol$^{-1}$ or higher negative is connected to chemical bonding through the sharing of electrons between inhibitor molecules and metallic surfaces. In the present disclosure, $\Delta G_{ads}$ was determined to be −40.43 kJ mol$^{-1}$, indicating that the adsorption of CMDDMDAC on the C1018 CS surface follows the pure chemisorption mode. Additionally, the negative sign of $\Delta G_{ads}$ confirmed that the adsorption of CMDDMDAC on the C1018 CS surface is a spontaneous process.

activation energies and thermodynamic adsorption studies of L-cysteine methyl ester hydrochloride as copper corrosion inhibitor in nitric acid 2M, Int. J. Electrochem. Sci, 6 (2011) 6261-6274; and F. Yan, B. Jiang, Z. Wang, J. Shi, Effect of thermal activation energy on the structure and conductivity corrosion resistance of Cr doped TiN films on metal bipolar plate, Materials Chemistry and Physics, (2022) 126082, each of which is incorporated herein by reference in their entirety].

Example 9: Electrochemical Studies

Potentiodynamic Polarization (PDP) Study

As used herein, the term 'potentiodynamic polarization' describes the recorded change in a system's electrical potential (voltage) [D. C. Silverman, Tutorial on cyclic potentiodynamic polarization technique, CORROSION 98, OnePetro, 1998, which is incorporated herein by reference in its entirety]. For assessing corrosion in the lab, potentiodynamic polarization is frequently employed. It can provide information on degradation mechanisms, corrosion rate, and

TABLE 2

Adsorption isotherm parameters for CMDDMDAC

| Sample | Temkin | | Frumkin | | Freundlich | | Langmuir | | |
|---|---|---|---|---|---|---|---|---|---|
| | $R^2$ | f | $R^2$ | a | $R^2$ | N | $R^2$ | $K_{ads}$ (L mol$^{-1}$) | $\Delta G°_{ads}$ (kJ mol$^{-1}$) |
| CMDDMDAC | 0.7991 | 9.91 | 0.9554 | 2.29 | 0.7551 | 0.11 | 0.9994 | 1.68 × 105 | −40.43 |

Figure 5:
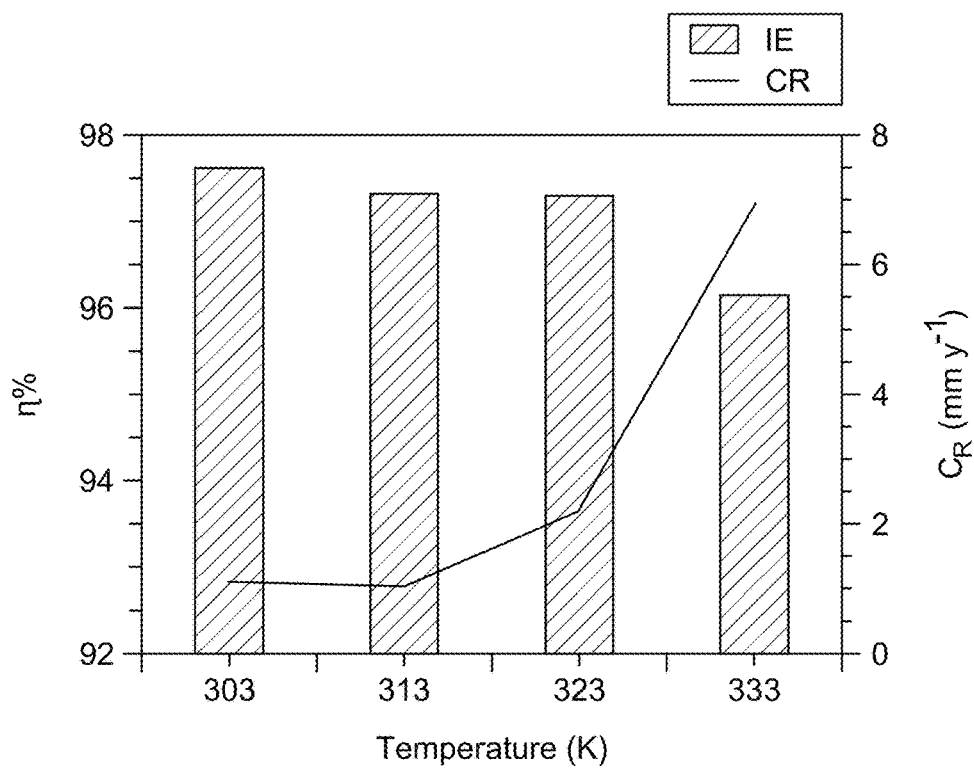
FIG. 5 depicts the effect of temperature variation (303-333 K) on the corrosion inhibition efficiency of CMDDMDAC, according to certain embodiments.

Weight loss studies were conducted at various temperatures (303-333 K) in the absence and presence of an optimal concentration of CMDDMDAC to evaluate the impact of temperature on the $\eta\ \%_{WL}$ of the inhibitor molecule. The effect of temperature on the $\eta\ \%_{WL}$ of CMDDMDAC is depicted in FIG. 5. CMDDMDAC manifests the $\eta\ \%_{WL}$ of 97.63%, 97.33%, 97.31%, and 96.16% at 303, 313, 323, and 333 K, respectively. These results showed no significant change in the corrosion inhibition potential of CMDDMDAC on increasing the temperature from 303 to 333 K. This type of phenomenon is attributed to the chemical adsorption of inhibitor molecules in an aqueous electrolyte. Therefore, CMDDMDAC can be a high-temperature corrosion inhibitor for C1018 CS.

Figure 7:
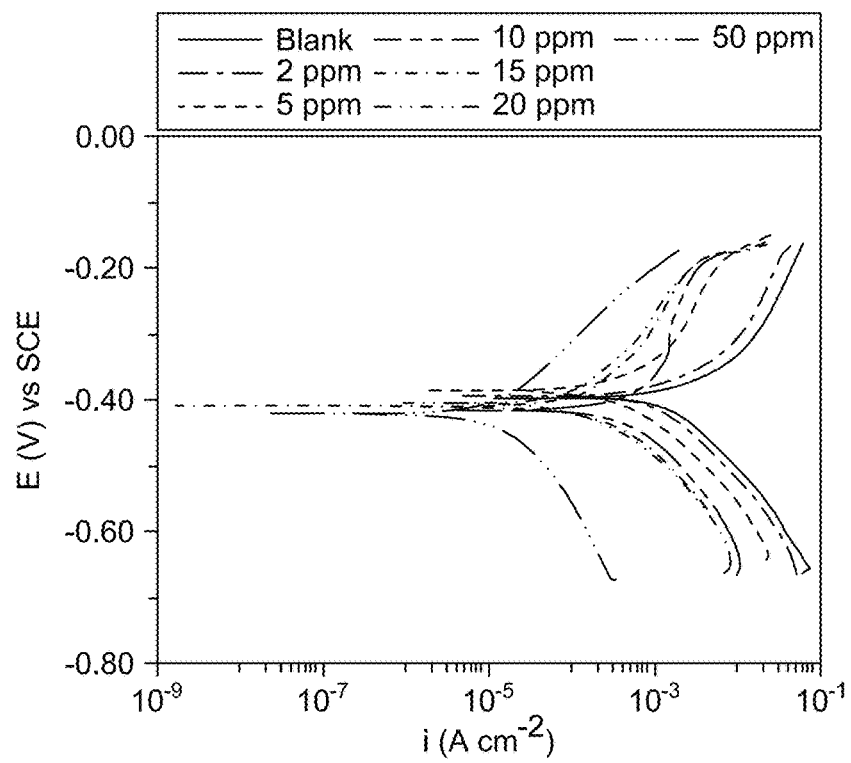
FIG. 7 depicts potentiodynamic polarization (Tafel) curves for the C1018 CS corrosion in 15% HCl in both the absence and presence of CMDDMDAC at 303 K, according to certain embodiments.
Figure 8A:
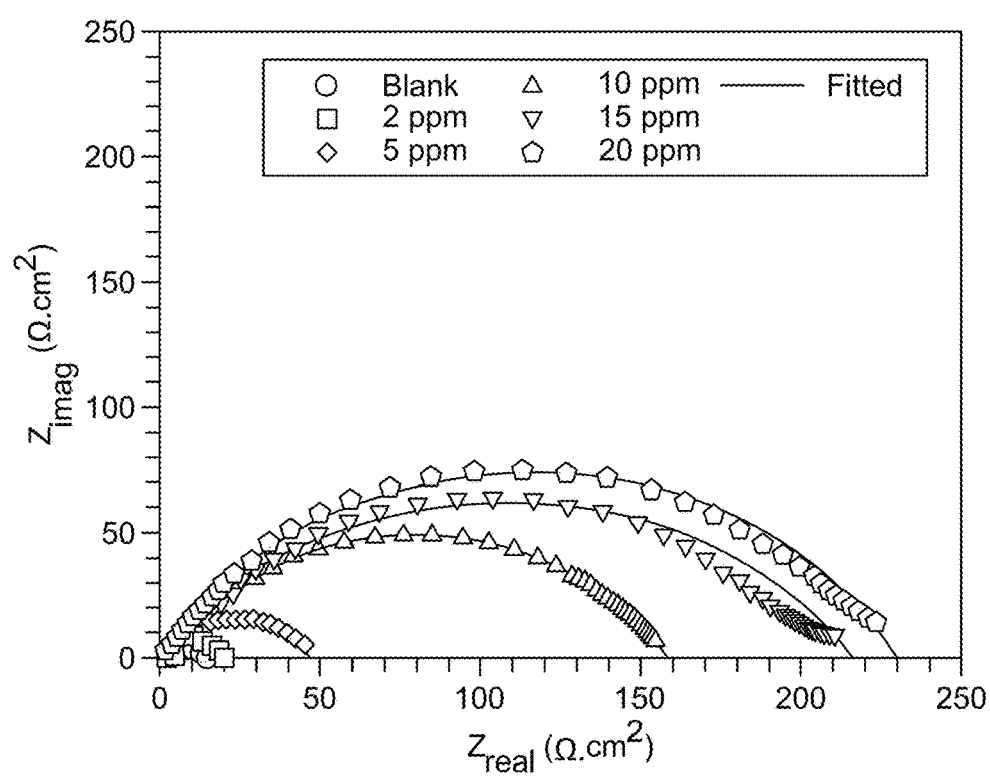
FIG. 8A depicts Nyquist curves for the C1018 CS corrosion in 15% HCl with and without CMDDMDAC, at different concentrations, according to certain embodiments.
Figure 8B:
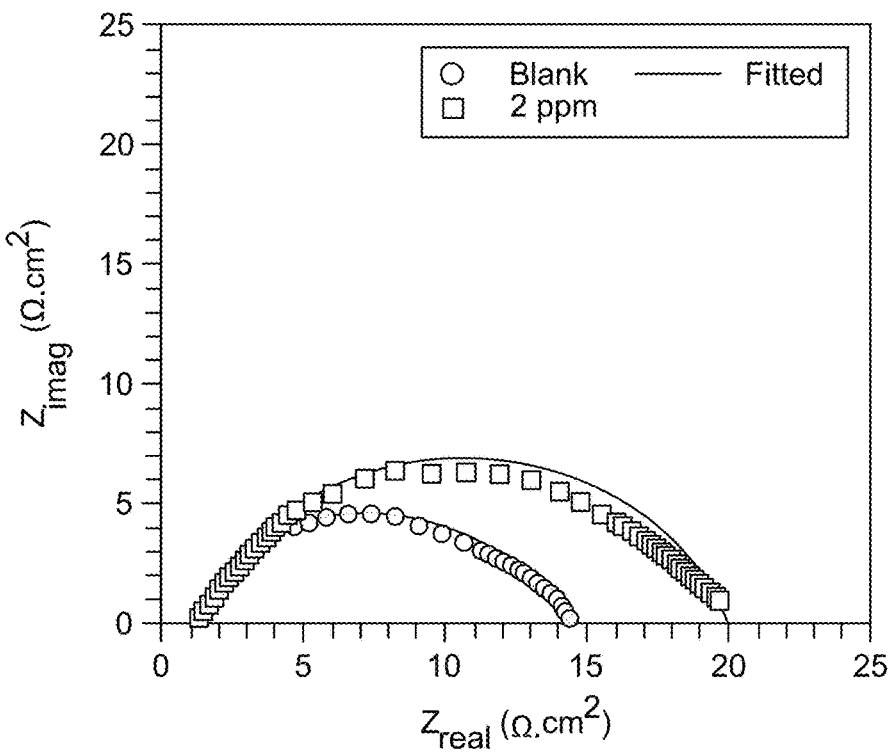
FIG. 8B depicts a zoomed-in graph of FIG. 8A, according to certain embodiments.
Figure 8C:
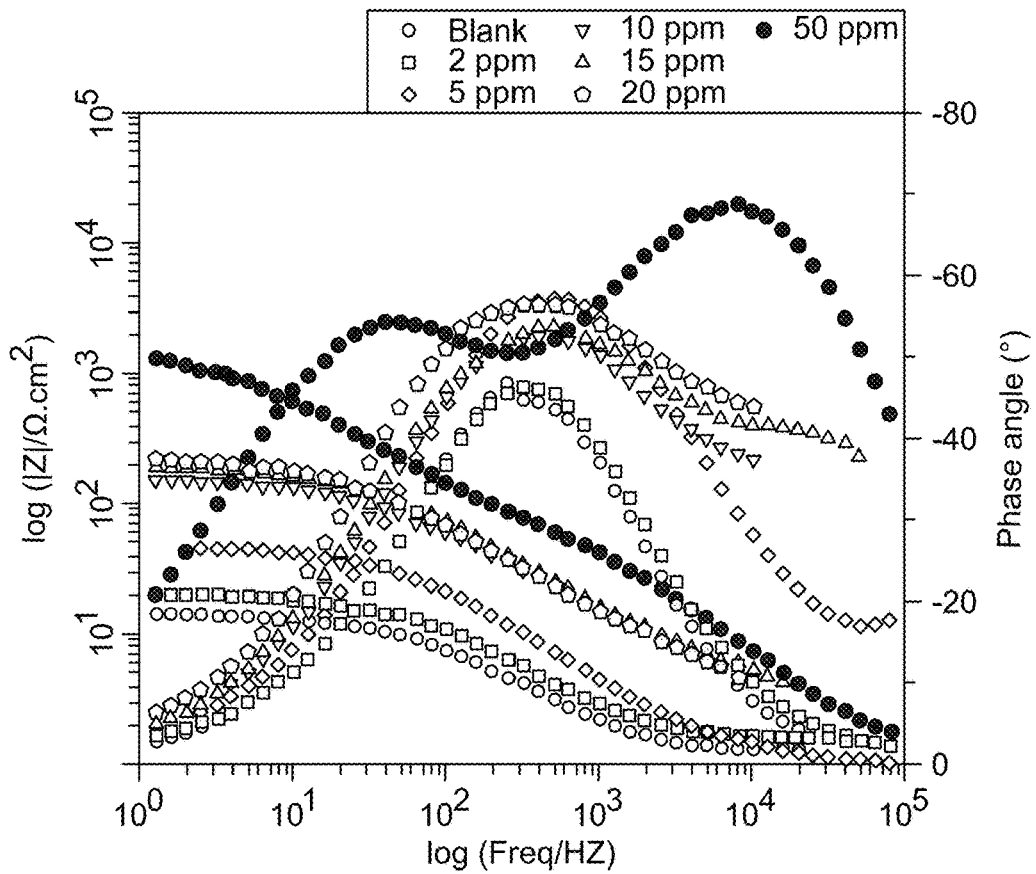
FIG. 8C depicts Bode curves for the C1018 CS corrosion in 15% HCl with and without CMDDMDAC, at different concentrations, according to certain embodiments.
Figure 8D:
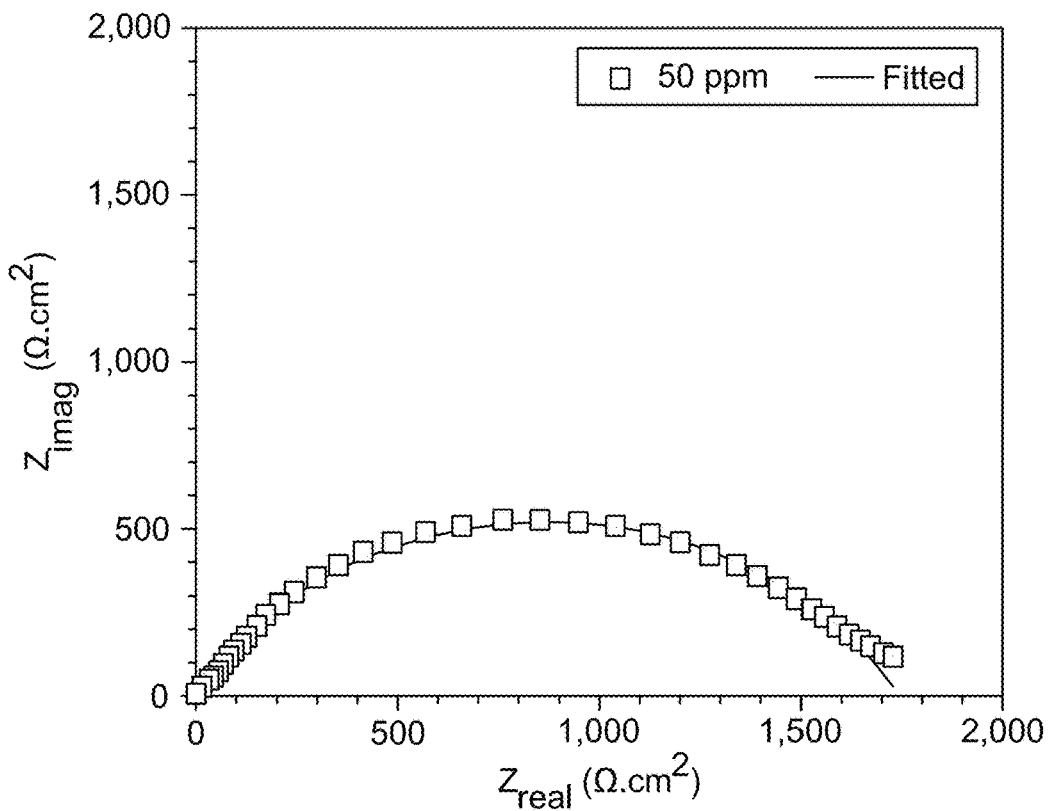
FIG. 8D depicts fitted Nyquist curves for the C1018 CS corrosion in 15% HCl with and without CMDDMDAC, at different concentrations, according to certain embodiments.
Figure 8E:
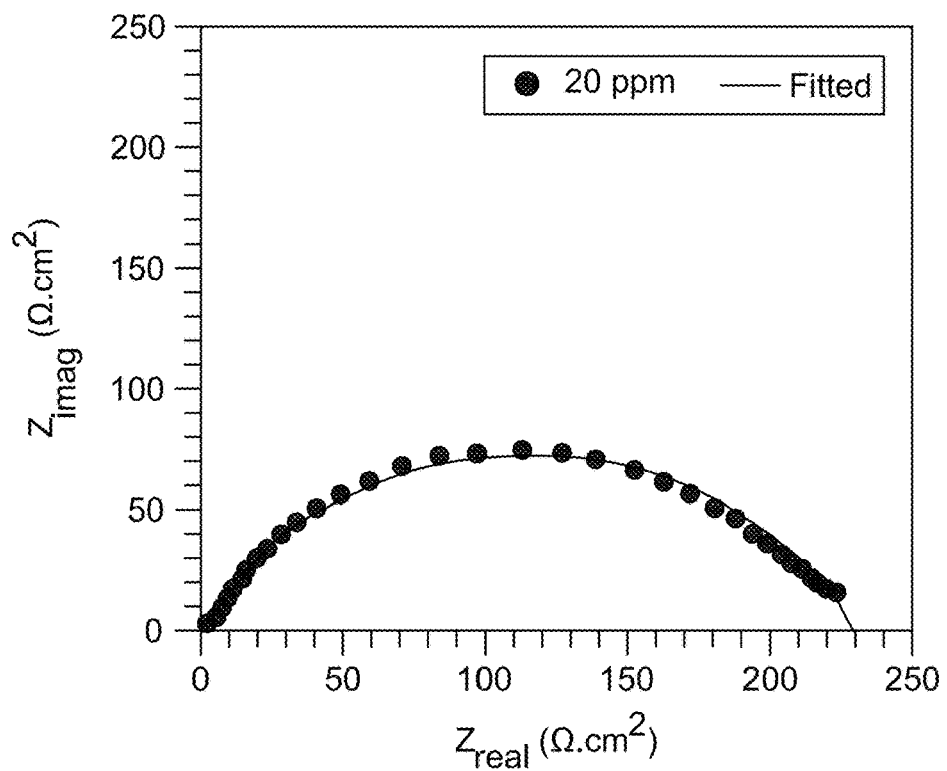
FIG. 8E depicts zoomed-in graph of FIG. 8D, according to certain embodiments.
Figure 8F:
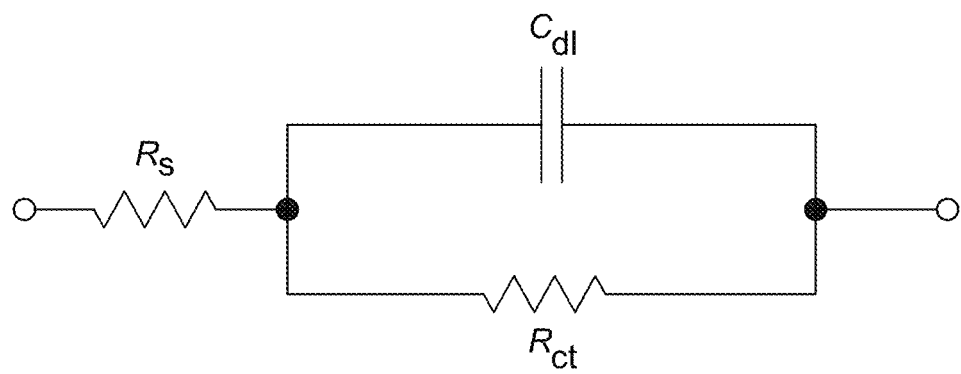
FIG. 8F depicts an electrical equivalent circuit used for fitting and analyzing Nyquist plots, according to certain embodiments.

The influence of temperature on corrosion rate can be shown via the Arrhenius equation (equation 15):

$$\log C_R = \frac{-E_a}{2.303RT} + \log A \quad (15)$$

where $C_R$, A, R, and T are the corrosion rate (milligram per square centimeter per hour (mg cm$^{-2}$ h$^{-1}$)), Arrhenius pre-exponential factor, gas constant, and absolute temperature, respectively. FIG. 6 shows an Arrhenius plot, which shows a straight line between $C_R$ and 1/T. From the slopes ($-\Delta E_a/2.303R$) of the Arrhenius plot, the values of activation energies for C1018 CS corrosion in 15% HCl with and without CMDDMDAC were calculated. For C1018 CS corrosion in 15% HCl, the $E_a$ values were 63.98 and 76.07 kJ mol$^{-1}$ in the absence and presence of CMDDMDAC, respectively. The higher Ea value suggested the presence of an energy barrier preventing the dissolution of C1018 CS in the presence of CMDDMDAC [A. Zarrouk, B. Hammouti, H. Zarrok, S. Al-Deyab, M. Messali, Temperature effect, susceptibility of particular materials in specific situations. One of the methods for measuring the dissolution of metallic specimens is the PDP test. The PDP study estimates the potential difference between working (being tested) and a reference electrode. FIG. 7 shows the PDP curves for C1018 CS corrosion in 15% HCl both with and without CMDDMDAC, while Table 3 lists various PDP parameters such $i_{corr}$; current density, $E_{corr}$; corrosion potential, $\beta_a$; anodic Tafel slope, $\beta_c$; cathodic Tafel slope as well as inhibition efficiency ($\eta\ \%_{PDP}$). Comparing the presence of CMDDMDAC to the control sample, it can be seen that the cathodic and anodic Tafel lines are parallel. Thus, the adsorption of CMDDMDAC only affects the active site of the anodic and cathodic processes on the metal surface without influencing the actual corrosion mechanism and only results in the inactivation of part of the surface. The values of anodic and cathodic Tafel slopes are considerably changed in the presence of CMDDMDAC; however, the maximum shift in the value of $E_{corr}$ was less than −85 mV compared to the blank. This finding suggests that CMDDMDAC behaves as a mixed-type corrosion inhibitor [H. Zheng, B. Zhang, X. Wang, Y. Lu, F. Li, C. Li, Improved corrosion resistance of carbon steel in soft water with dendritic-polymer corrosion inhibitors, Chemical Engineering Journal, 452 (2023) 139043; Q. Liu, J. Liu, J. Wang, Y. Chong, Corrosion inhibition effect of betaine type quaternary ammonium salt on AA2024-T3 in 0.01 mol·L-1 NaOH: Experimental and theoretical research, Journal of Molecular Structure, 1274 (2023) 134395; and Z. Liu, B. Fan, J. Zhao, B. Yang, X. Zheng, Benzothiazole derivatives-based supramolecular assemblies as efficient corrosion inhibitors for copper in artificial seawater: Formation, interfacial release and protective mechanisms, Corrosion Science, (2023) 110957, each of which is incorporated herein by reference in their entirety]. CMDDMDAC causes a significant decrease in corrosion current. This occurrence highlighted that the examined CMDDMDAC adsorbed on the active sites and created a more stable layer on the surface of C1018 CS steel.

TABLE 3

Electrochemical parameters from polarization experiments for C1018 CS corrosion in 15% HCl in the absence and presence of CMDDMDAC at 303K

| Conc. (ppm) | $E_{corr}$ (mV) | PDP $\beta_a$ (mV dec$^{-1}$) | $\beta_c$ (mV dec$^{-1}$) | $I_{corr}$ (µA · cm$^{-2}$) | $\eta_{PDP}$ (%) | $R_p$ (Ωcm$^2$) | LPR $\eta_{LPR}$ (%) |
|---|---|---|---|---|---|---|---|
| Blank | −395.0 | 84.40 | 213.20 | 2350 | — | 15.43 | — |
| 2 | −391.0 | 100.90 | 241.50 | 1770 | 24.68 | 19.80 | 22.07 |
| 5 | −384.0 | 305.60 | 278.00 | 1110 | 52.77 | 33.33 | 53.71 |
| 10 | −407.0 | 454.00 | 171.60 | 411.2 | 82.50 | 104.2 | 85.19 |
| 15 | −408.0 | 184.60 | 86.10 | 200.0 | 91.49 | 195.3 | 92.10 |
| 20 | −404.0 | 181.80 | 72.90 | 135.0 | 94.26 | 250.7 | 93.85 |
| 50 | −420.0 | 137.90 | 198.80 | 19.00 | 99.19 | 1990 | 99.22 |

Electrochemical Impedance Spectroscope (EIS) Study

Anti-corrosion effectiveness of protective film can be quickly evaluated using the well-established quantitative technique known as EIS. EIS measurements deliver efficient data, enabling the prediction of the coatings' long-term performance. EIS experiments were carried out at 303 K to evaluate the corrosion resistance of the C1018 CS electrode in 15% HCl solution in the presence and absence of different concentrations of CMDDMDAC. The Nyquist and Bode plots for C1018 CS/15% HCl system are shown in FIGS. 8A-8F. A single capacitive loop is seen as a slightly depressed semi-circle in the Nyquist plot. This capacitive loop indicates that the capacitor did not operate optimally during the metal/solution border phase.

Additionally, such capacitive loops' widths considerably grow without changing their distinctive characteristics as the inhibitor dosage in the test solution rises. This shows that the examined molecule's adsorption delays C1018 CS corrosion in 15% HCl without changing the electrochemical properties of the corrosion process [H. Liu, Z. Jin, Z. Wang, H. Liu, G. Meng, H. Liu, Corrosion inhibition of deposit-covered X80 pipeline steel in seawater containing *Pseudomonas stutzeri*, Bioelectrochemistry, 149 (2023) 108279; and S. G. Kim, B. Ryplida, H. J. Jo, G. Lee, S. Y. Park, Stimuli-responsive conductive hydrogel touch sensor for electrochemical and fluorescence monitoring of acetylcholinesterase activity and inhibition, Chemical Engineering Journal, 452 (2023) 139028, each of which is incorporated herein by reference in their entirety]. Bode-phase plots revealed a single peak within the investigated frequency range, indicating one phase maximum connected to one relaxation process (one-time constant). This can be explained by a single charge transfer mechanism at the metal-electrolyte interface. The rise in resistance and phase angle values is ascribed to more molecules adhering to the electrode's surface with increasing concentration, creating a barrier that prevents the metal from dissolving in acidic conditions. The Nyquist plots were fitted and analyzed using the simple electrical equivalent circuit depicted in FIG. 8F.

Different EIS parameters are presented in Table 4. The solution resistance ($R_s$), charge transfer resistor ($R_{ct}$), and constant phase element ($R_s$) make up this equivalent circuit (CPE). A charge transfer resistor ($R_{ct}$), solution resistance ($R_s$), and a constant phase element make up this equivalent circuit (CPE). The constant phase element (CPE) was used in the present disclosure to replace the double-layer capacitance to establish a more exact and accurate fit of the impedance data. The impedance nature of CPE is defined by equations 16-17 [K. Jüttner, Electrochemical impedance spectroscopy (EIS) of corrosion processes on inhomogeneous surfaces, Electrochimica Acta, 35 (1990) 1501-1508; A. I. Muñoz, J. G. Antón, J. Guiñón, V. P. Herranz, Inhibition effect of chromate on the passivation and pitting corrosion of a duplex stainless steel in LiBr solutions using electrochemical techniques, Corrosion Science, 49 (2007) 3200-3225; and H. H. Hernández, A. M. R. Reynoso, J. C. T. González, C. O. G. Morán, J. G. M. Hernández, A. M. Ruiz, J. M. Hernández, R. O. Cruz, Electrochemical impedance spectroscopy (EIS): A review study of basic aspects of the corrosion mechanism applied to steels, Electrochemical Impedance Spectroscopy, (2020) 137-144, each of which is incorporated herein by reference in their entirety]:

$$Z_{CPE} = \left(\frac{1}{Y_0}\right)[(j\omega)_n]^{-1} \quad (16)$$

$$C_{dl} = Y_0(\omega_{max})^{n-1} \quad (17)$$

where n, j, $Y_0$, and ω are the phase shift, imaginary number, the CPE constant, and the angular frequency (exponent), respectively. The n value measures the degree of surface inhomogeneity caused by factors such as surface roughness, porous film formation, and adsorption of CMDDMDAC. Depending on the value of n, CPE may represent Warburg impedance (n=0.5), inductance (n=1), capacitance (n=1), or resistance (n=0). The proximity of the n values to unity in our current investigation shows that the CPE functions as a pseudocapacitor for C1018 CS in a 15% HCl system. The analysis of the data (Table 4) reveals that $R_{ct}$ grew when inhibitor concentration was raised while $C_{dl}$ values decreased, indicating that the inhibitor worked by adsorption at the metal/electrolyte interfaces.

TABLE 4

Electrochemical parameters from impedance experiments for C1018 CS corrosion in 15% HCl in the absence and presence of CMDDMDAC at 303K

| Sample | Conc. (ppm) | $R_s$ ($\Omega$ cm$^2$) | $R_{ct}$ ($\Omega$ cm$^2$) | n | $C_{dl}$ ($\mu$F · cm$^{-2}$) | $\eta$ (%) | $\theta$ | The goodness of fit ($\times 10^{-3}$) |
|---|---|---|---|---|---|---|---|---|
| Blank | — | 1.3 | 13.12 | 0.83 | 187.97 | — | — | 1.66 |
| CMDDMDAC | 2 | 1.46 | 17.24 | 0.797 | 140.65 | 23.94 | 0.2394 | 0.98 |
|  | 5 | 0.96 | 29.03 | 0.778 | 77.43 | 54.81 | 0.5481 | 2.41 |
|  | 10 | 2.82 | 81.491 | 0.719 | 32.13 | 83.9 | 0.839 | 0.98 |
|  | 15 | 1.49 | 214.02 | 0.664 | 29.34 | 93.87 | 0.9387 | 4.19 |
|  | 20 | 2.07 | 225.63 | 0.73 | 33.48 | 94.19 | 0.9419 | 1.18 |
|  | 50 | 0.27 | 1739.73 | 0.683 | 34.17 | 99.25 | 0.9925 | 13.08 |

Surface (SEM and EDX) Studies

One of the most popular methods for inspecting and assessing the surface and elemental components of specimens linked to corrosion is SEM/EDX. SEM analysis can be used to evaluate how metals interact with corrosive environments, particularly in relation to the morphology of the metal surface and the buildup of corrosion products. Nonetheless, EDX can swiftly produce information concerning the chemical or elements present over the metallic surface. The SEM images of the polished and corroded C1018 CS surface in 15% HCl in the presence and absence of CMDDMDAC are shown in FIGS. 9A-9C. It can be seen that the C1018 CS surface is highly smooth without any significant surface imperfections and accumulation of corrosion products. However, the surface of C1018 CS removed from the 15% HCl solution is severely corroded and destroyed, exhibiting mountain-like features. This may be feasible because there is no defense against the direct attack of corrosive species or electrolyte ions. However, the C1018 CS surface appearance after 15% HCl corrosion in the presence of 50 ppm of CMDDMDAC is noticeably smoothened. This can be feasible due to CMDDMDAC's adsorption, which causes the corrosion protective film to form.

EDS, EDX, or EDXA, commonly known as energy-dispersive X-ray spectroscopy, is a powerful method that enables the user to examine the elemental makeup of a chosen sample. The creation of X-rays from a specimen by an electron beam is the fundamental idea behind EDX. The sample's features and type of elements are used to generate the X-rays. The typical EDX analyzers can detect elements with atomic numbers ranging from 11 (sodium) and above. The windowless EDX analyzer can identify substances starting with boron (atomic number 5), including the primary substance elements (C, N, and O). The adsorption mechanism of corrosion protection by organic inhibitors is usually supported by EDX, designated as EDS, EDX, or EDS. The availability of particular elements displays the inhibitors' chemical structures and is typically used as a guide in EDX studies. EDX mapping and EDX spectra of the polished and corroded C1018 CS surface in 15% HCl in the presence and absence of CMDDMDAC are shown in FIGS. 10A-10F.

The EDX spectrum of polished C1018 CS surface manifests the presence of four elements, i.e., Mn, O, C, and Fe, having wt. % of 1.0%, 1.9%, 3.4%, and 93.6%, respectively (as shown in Table 5).

TABLE 5

EDX spectrum of polished C1018 CS surface Map Sum Spectrum

|  | Wt. % | $\Sigma$ |
|---|---|---|
| Fe | 93.6 | 0.2 |
| C | 3.4 | 0.2 |
| O | 1.9 | 0.1 |
| Mn | 1 | 0.1 |

An extra peak for chlorine that results from the HCl is present in the EDX spectra of the unconstrained C1018 CS surface. Unrestricted corrosion causes the surface elements to be severely corroded and removed, changing the elemental makeup. The wt. % of Cl, Mn, O, C, and Fe was 0.4%, 1.0%, 4.4%, 27.4%, and 66.7%, respectively (table 6).

TABLE 6

EDX spectrum of corroded C1018 CS surfaces in 15% M HCl in the absence of CMDDMDAC Map Sum Spectrum

|  | Wt. % | $\Sigma$ |
|---|---|---|
| Fe | 66.7 | 0.5 |
| O | 27.4 | 0.3 |
| C | 4.4 | 0.7 |
| Mn | 1 | 0.1 |
| Cl | 0.4 | 0.1 |

The EDX spectrum of the C1018 CS surface corroded in the presence of 50 ppm of CMDDMDAC depicts an additional signal for nitrogen (wt. %=0.3%) (Table 7). The adsorption of CMDDMDAC on the metallic surface is responsible for the nitrogen's availability in the EDX spectrum of the inhibited sample.

TABLE 7

EDX spectrum of corroded C1018 CS surfaces in 15% M HCl in the presence of CMDDMDAC Map Sum Spectrum

|  | Wt. % | $\sigma$ |
|---|---|---|
| Fe | 83.4 | 1.2 |
| O | 10.4 | 0.3 |
| C | 5.1 | 1.3 |
| Mn | 0.7 | 0.1 |
| Cl | 0.6 | 0.1 |
| N | 0.3 | 1 |

DFT Studies and Mechanism of Corrosion Inhibition

Figure 11:
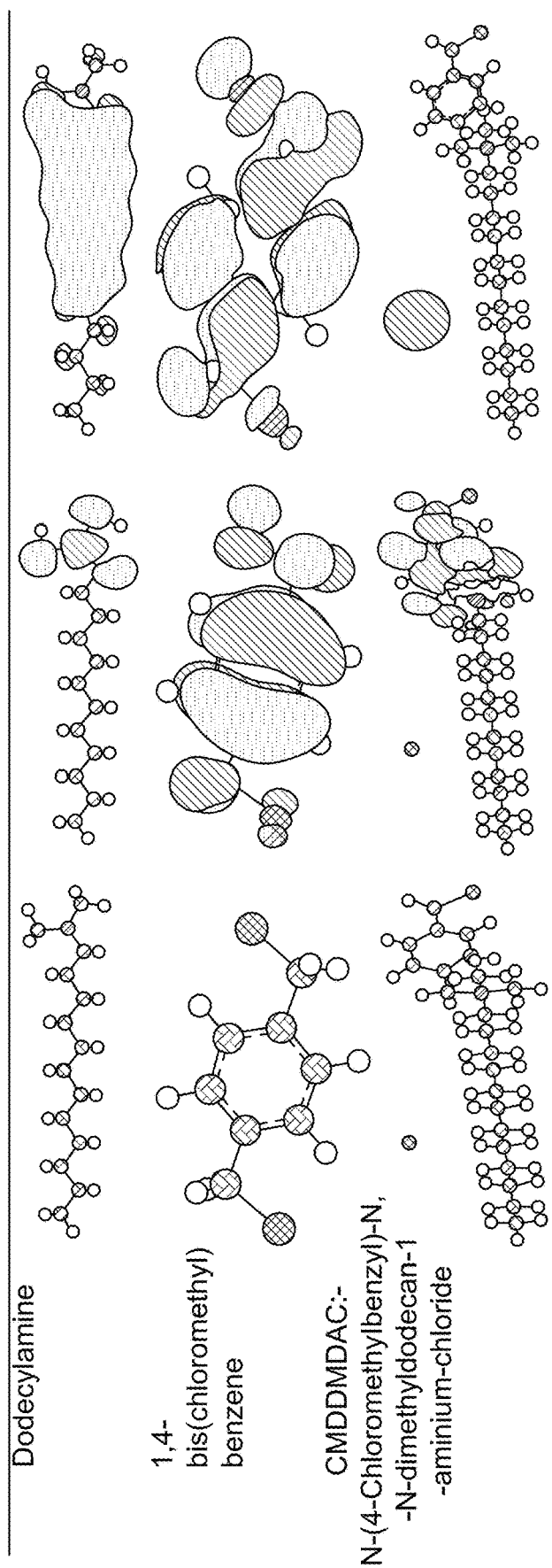
FIG. 11 depicts frontier molecular orbitals (FMOs) pictures of dodecylamine, 1,4-bis(chloromethyl)benzene, and (N-(4-chloromethylbenzyl)-N, N-dimethyldodecan-1-aminium chloride), according to certain embodiments.

To find out the mechanism of corrosion inhibition of CMDDMDAC, DFT-based computational studies were performed for CMDDMDAC along with its building blocks. The frontier molecular orbitals of dodecylamine, 1,4-bis (chloromethyl)benzene, and CMDDMDAC are shown in FIG. 11, and corresponding DFT parameters are illustrated in Table 8. The HOMO covers the tertiary (3o) nitrogen in dodecylamine. This is because, in the molecular structure of dodecylamine, this nitrogen is the most electron-dense position with an unshared electron pair. LUMO is also mainly distributed over nitrogen and neighboring hydrocarbon chains. These observations suggest tertiary nitrogen dramatically participates in the charge sharing with the metallic surface in its free state. Inspection of the FMOs of 1,4-bis (chloromethyl)benzene indicates that HOMO and LUMO are distributed over the entire phenyl ring, with two chloromethyl moieties present at para (p–) position. This finding concluded that the phenyl ring and two chloromethyl substituents share the charge with the metal surface. However, when dodecylamine and 1,4-bis(chloromethyl)benzene are combined in CMDDMDAC's chemical structure, it is anticipated that CMDDMDAC will experience a change in its physiochemical, charge distribution and sharing, and corrosion by 5-(4-pyridyl)-1, 3, 4-oxadiazole-2-thiol in saline environment, Electrochimica Acta, 398 (2021) 139282, each of which is incorporated herein by reference in their entirety]. The converse is valid for the $E_{LUMO}$ value. Data presented in Table 8 shows that CMDDMDAC is associated with the highest value of $E_{HOMO}$ (in the positive direction) and the lowest value of $E_{LUMO}$ (in the negative direction). These outcomes suggest that the electron-donating and electron-accepting capabilities of dodecylamine and 1,4-bis(chloromethyl)benzene get magnified in CMDDMDAC. One of the key parameters used to describe organic inhibitors' relative reactivity and corrosion inhibition potential is the energy band gap, i.e., $\Delta E = E_{LUMO} - E_{HOMO}$. Generally, a lower value of $\Delta E$ is connected with a high inhibition potential. The data analysis in Table 8 revealed that CMDDMDAC has a lower $\Delta E$ value than dodecylamine and 1,4-bis(chloromethyl)benzene, its two building blocks. When compared to its counterpart, a chemical species with greater values for softness ($\sigma$), the fraction of electron transfer ($\Delta N$), and the dipole moment ($\mu$) is associated with high reactivity and corrosion inhibition activity. For the hardness ($\eta$) value, the opposite is true. These criteria in the present experiment imply that CMDDMDAC has superior anticorrosive action compared to its constituent parts.

TABLE 8

DFT parameters derived for dodecylamine, 1,4-bis(chloromethyl)benzene and N-(4-chloromethylbenzyl)-N,N-dimethyldodecan-1-aminium chloride using Gaussian 09

| Compound | $E_{HOMO}$ (eV) | $E_{LUMO}$ (eV) | $\Delta E$ (eV) | $\eta$ | $\sigma$ | $\Delta N$ | $\mu$ |
|---|---|---|---|---|---|---|---|
| Dodecylamine | −4.413 | 2.161 | 6.574 | 3.287 | 0.304 | 0.562 | 0.098 |
| 1,4-bis(chloromethyl)-benzene | −6.804 | −0.439 | 6.365 | 3.183 | 0.314 | 0.188 | 0.579 |
| CMDDMDAC | −2.085 | −2.050 | 0.035 | 0.018 | 56.976 | 78.408 | 78.002 | sion mitigation propensity. The quaternary nitrogen and 1,4-bis(chloromethyl)benzene segments are seen to have HOMO over them in CMDDMDAC's FMOs, indicating that these sections of the molecule are heavily involved in interactions with the metallic surface. But CMDDMDAC has no LUMO, suggesting that it is not likely to accept the electrons from the metal by back-donation. It is anticipated that the quaternary compound, which naturally contains two methyl groups, one 4-chloromethylbenzyl, and one dodecyl substituent, will interact with the metal surface through physisorption since in CMDDMDAC the unshared electron pair of nitrogen is lost.

The value of $E_{HOMO}$ represents the electron-donating capability of inhibitor molecules, and a high value of $E_{HOMO}$ is associated with increased reactivity and binding affinity with the metallic surface [H. Wang, X. Wang, H. Wang, L. Wang, A. Liu, DFT study of new bipyrazole derivatives and their potential activity as corrosion inhibitors, Journal of Molecular Modeling, 13 (2007) 147-153; C. Verma, H. Lgaz, D. Verma, E. E. Ebenso, I. Bahadur, M. Quraishi, Molecular dynamics and Monte Carlo simulations as powerful tools for study of interfacial adsorption behavior of corrosion inhibitors in aqueous phase: a review, Journal of Molecular Liquids, 260 (2018) 99-120; and S. Varvara, C. Berghian-Grosan, R. Bostan, R. L. Ciceo, Z. Salarvand, M. Talebian, K. Raeissi, J. Izquierdo, R. M. Souto, Experimental characterization, machine learning analysis and computational modelling of the high effective inhibition of copper corrosion by 5-(4-pyridyl)-1, 3, 4-oxadiazole-2-thiol in a saline environment, Electrochimica Acta, 398 (2021) 139282; O. Olivares-Xometl, N. Likhanova, M. Domínguez-Aguilar, E. Arce, H. Dorantes, P. Arellanes-Lozada, Synthesis and corrosion inhibition of α-amino acids alkylamides for mild steel in acidic environment, Materials Chemistry and Physics, 110 (2008) 344-351, each of which is incorporated herein by reference in their entirety]. CMDDMDAC may adsorb on the C1018 CS/15% HCl interface through one of three processes: (I) electrostatic attraction of charged (protonated) molecules with previously existing chloride ions (physisorption); (II) π-electrons of the aromatic (phenyl ring) ring and vacant d-orbitals of Fe surface atoms (chemisorption); or (III) interaction of irons' d-electron with the vacant orbital of the CMDDMDAC (retro donation). The aromatic ring transfers its π-electron to the metal d-orbital as CMDDMDAC reaches the C1018 CS surface via electrostatic attraction between the quaternary ammonium and charges metallic surface (donation). The C1018 CS surface becomes more negatively charged as electrons accumulate on it due to donation. To counteract this, electrons from the d-orbital of iron could be transferred to the empty (antibonding) orbital of CMDDMDAC (reterodonation). The donation and retro-donation strengthen each other [O. Olivares-Xometl, N. Likhanova, M. Domínguez-Aguilar, E. Arce, H. Dorantes, P. Arellanes-Lozada, Synthesis and corrosion inhibition of α-amino acids alkylamides for mild steel in acidic environment, Materials Chemistry and Physics, 110 (2008) 344-351, which is incorporated herein by reference in its entirety].

In the present disclosure, dodecylamine and 1,4-bis(chloromethyl)benzene are combined to create a quaternary surfactant called N-(4-chloromethylbenzyl)-N, N-dimethyldodecan-1-aminium chloride (CMDDMDAC). The synthetic surfactant was tested as a corrosion inhibitor for C1018 CS in a 15% HCl combination. According to a weight loss study, CMDDMDAC exhibits inhibitory efficiency, and its protective power is concentration dependent. At 50 ppm concentration, a high efficiency was achieved. CMDDMDAC manifests the inhibition efficiencies of 97.63%, 97.33%, 97.31%, and 96.16% at 303, 313, 323, and 333 K, respectively. An increase in the temperature from 303K to 333 K did not cause even a 1% change in inhibition efficiency, validating that CMDDMDAC can be used as a high-temperature corrosion inhibitor. CMDDMDAC becomes effective by adsorbing on the interface of the C1018 CS and 15% HCl, following through Langmuir isotherm. EIS studies show that CMDDMDAC adsorbs at the interface of C1018 CS and 15% HCl, creating a barrier for the charge transfer process. Thereby, CMDDMDAC may act as an interface-type inhibitor. PDP study show that CMDDMDAC inhibits both anodic and cathodic reactions without any noticeable shift in $E_{corr}$ value. Therefore, CMDDMDAC may behave as a mixed-type inhibitor. SEM and EDS analyses were undertaken to describe the adsorption mode of corrosion inhibition. DFT-based computational studies show quaternary nitrogen and bis(chloromethyl)benzene impact charge sharing, and their corrosion inhibition potential is amplified in CMDDMDAC.

Numerous modifications and variations of the present disclosure are possible in light of the above teachings. It is therefore to be understood that within the scope of the appended claims, the invention may be practiced otherwise than as specifically described herein.

The invention claimed is:

1. A method for inhibiting corrosion of a metal article in contact with a solution comprising an acid, the method comprising:
adding to the solution a corrosion inhibitor in an amount of 1 to 500 parts per million (ppm) based on a total number of parts by mass of the solution thereby adsorbing the corrosion inhibitor onto a surface of the metal article via at least one interaction to form a barrier layer in the form of a composite;
wherein the at least one interaction comprises a physisorption, a chemisorption, and a retro donation;
wherein the corrosion inhibitor has a formula (II)

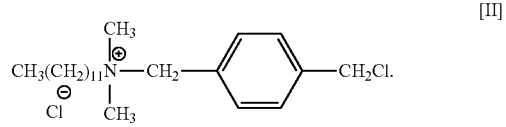

2. The method of claim 1, wherein the acid comprises at least one of hydrochloric acid, sulfuric acid, nitric acid, phosphoric acid, boric acid, and citric acid.

3. The method of claim 1, wherein the acid is present in the solution at a concentration of from 0.05 to 30 wt. % based on a total weight of the solution.

4. The method of claim 1, wherein the metal article comprises at least one metal selected from the group consisting of a carbon steel, a carbon steel alloy, and a mild steel.

5. The method of claim 4, wherein the metal article is made of carbon steel, and wherein the carbon steel comprises 0.1-2.0 wt. % Mn, 0.5-4.0 wt. % O, 1.0-8.0 wt. % C, and Fe as a balance, as determined by Energy-dispersive X-ray (EDX) spectroscopy.

6. The method of claim 1, wherein the metal article is part of a casing, a pipe, a pump, a screen, a valve, or a fitting of an oil or gas well.

7. The method of claim 1, wherein the corrosion inhibitor is present in the solution in an amount of 10 to 50 ppm based on a total number of parts of the solution.

8. The method of claim 1, wherein the barrier layer has an average thickness in a range of 10 to 1000 nanometers (nm).

9. The method of claim 1, wherein the surface of the metal article containing the barrier layer has a smoother surface morphology compared to a surface of the metal article in contact with an acid solution without the presence of the corrosion inhibitor.

10. The method of claim 1, wherein the corrosion inhibitor is adsorbed onto the surface of the metal article at a temperature of from 303 to 333 kelvin (K).

11. The method of claim 1, wherein the contacting is for at least 2 hours.

12. The method of claim 1, having an inhibition efficiency of 96 to 98% when the metal article is in contact with the solution at from 303 to 333 K, and the corrosion inhibitor is present in the solution in an amount of about 50 ppm based on a total number of parts of the solution.

13. The method of claim 1, wherein the metal article has a corrosion rate of less than 8 millimeters per year (mm y$^{-1}$) in the solution comprising the acid and the corrosion inhibitor.

14. The method of claim 1, wherein the metal article has an $E_{corr}$ value of from −420 to −390 millivolts (mV) against the reversible hydrogen electrode ($V_{RHE}$).

* * * * *